(12) United States Patent
Yu et al.

(10) Patent No.: US 10,036,831 B2
(45) Date of Patent: Jul. 31, 2018

(54) NANOSTRUCTURED ARTICLES AND METHODS TO MAKE THE SAME

(75) Inventors: Ta-Hua Yu, Woodbury, MN (US); Moses M. David, Woodbury, MN (US); Douglas S. Dunn, Maplewood, MN (US); Seth M. Kirk, Minneapolis, MN (US); Brant U. Kolb, Afton, MN (US); William Blake Kolb, West Lakeland, MN (US); Mark A. Strobel, Maplewood, MN (US); Jun-Ying Zhang, Perrysburg, OH (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 802 days.

(21) Appl. No.: 14/237,401

(22) PCT Filed: Aug. 13, 2012

(86) PCT No.: PCT/US2012/050592
§ 371 (c)(1),
(2), (4) Date: Feb. 6, 2014

(87) PCT Pub. No.: WO2013/025614
PCT Pub. Date: Feb. 21, 2013

(65) Prior Publication Data
US 2014/0193612 A1 Jul. 10, 2014

Related U.S. Application Data

(60) Provisional application No. 61/593,696, filed on Feb. 1, 2012, provisional application No. 61/524,406, filed on Aug. 17, 2011.

(51) Int. Cl.
*G02B 1/04* (2006.01)
*C09D 5/00* (2006.01)
(Continued)

(52) U.S. Cl.
CPC ............... *G02B 1/04* (2013.01); *B82Y 20/00* (2013.01); *C08K 9/04* (2013.01); *C08K 9/08* (2013.01);
(Continued)

(58) Field of Classification Search
CPC .... G02B 1/04; G02B 2207/101; B82Y 20/00; B82Y 40/00; C09D 5/006; C09D 7/1266;
(Continued)

(56) References Cited

U.S. PATENT DOCUMENTS 3,333,032 A 7/1967 Dickinson
4,374,158 A 2/1983 Taniguchi
(Continued)

FOREIGN PATENT DOCUMENTS

EP 1558949 8/2005
JP 01-280462 11/1989
(Continued)

OTHER PUBLICATIONS

Author Unknown, Aug. 1, 2017, Definition of Disperse, Merriam-Webster Online.*

(Continued)

*Primary Examiner* — Nathan L Van Sell
(74) *Attorney, Agent, or Firm* — Gregory D. Allen

(57) ABSTRACT

Material comprising sub-micrometer particles dispersed in a polymeric matrix. The materials are useful in article, for example, for numerous applications including display applications (e.g., liquid crystal displays (LCD), light emitting diode (LED) displays, or plasma displays); light extraction; electromagnetic interference (EMI) shielding, ophthalmic lenses; face shielding lenses or films; window films; anti-reflection for construction applications; and construction applications or traffic signs.

17 Claims, 5 Drawing Sheets

2.00 μm

(51) Int. Cl.
*B82Y 20/00* (2011.01)
*B82Y 40/00* (2011.01)
*C08K 9/04* (2006.01)
*C08K 9/08* (2006.01)
*B05D 3/14* (2006.01)
*B05D 7/04* (2006.01)
*C09D 7/40* (2018.01)

(52) U.S. Cl.
CPC .............. *C09D 5/006* (2013.01); *C09D 7/67* (2018.01); *B05D 3/145* (2013.01); *B05D 7/04* (2013.01); *B05D 2601/22* (2013.01); *B82Y 40/00* (2013.01); *G02B 2207/101* (2013.01); *Y10T 428/24372* (2015.01)

(58) Field of Classification Search
CPC ..... C08K 9/04; C08K 9/08; Y10T 428/24372; B05D 3/145; B05D 7/04; B05D 2601/22
See application file for complete search history.

(56) References Cited

U.S. PATENT DOCUMENTS

| | | | |
|---|---|---|---|
| 4,409,285 A | 10/1983 | Swerdlow | |
| 4,816,333 A | 3/1989 | Lange | |
| 5,825,543 A | 10/1998 | Ouderkirk | |
| 5,867,316 A | 2/1999 | Carlson | |
| 5,882,774 A | 3/1999 | Jonza | |
| 5,888,594 A | 3/1999 | David | |
| 6,326,723 B1 | 12/2001 | Raj | |
| 6,352,761 B1 | 3/2002 | Hebrink | |
| 6,368,699 B1 | 4/2002 | Gilbert | |
| 6,645,843 B2 | 11/2003 | Kim | |
| 6,680,357 B1 | 1/2004 | Hedhli | |
| 6,891,677 B2 | 5/2005 | Nilsen | |
| 6,927,900 B2 | 8/2005 | Liu | |
| 7,374,812 B2 | 5/2008 | Mizuno | |
| 7,378,136 B2 | 5/2008 | Pokorny | |
| 7,604,381 B2 | 10/2009 | Hebrink | |
| 7,655,298 B2 | 2/2010 | Thies | |
| 7,704,608 B2 | 4/2010 | Thies | |
| 8,460,568 B2 | 6/2013 | David | |
| 8,637,141 B2 | 1/2014 | Gemici | |
| 8,999,052 B2 * | 4/2015 | Yabe | C01B 33/193 106/287.1 |
| 9,435,916 B2 | 9/2016 | David | |
| 2001/0013668 A1 | 8/2001 | Neavin | |
| 2002/0008461 A1 | 1/2002 | Raj | |
| 2006/0074172 A1 | 4/2006 | Yang | |
| 2006/0084780 A1 | 4/2006 | Hebrink | |
| 2006/0147674 A1 * | 7/2006 | Walker, Jr. | C08J 7/047 428/141 |
| 2007/0138405 A1 | 6/2007 | Shirck | |
| 2007/0286994 A1 | 12/2007 | Walker | |
| 2007/0291363 A1 * | 12/2007 | Asakura | G02B 5/0226 359/586 |
| 2008/0304008 A1 * | 12/2008 | Muisener | C09D 5/1693 351/159.01 |
| 2009/0087629 A1 | 4/2009 | Everaerts | |
| 2009/0229732 A1 | 9/2009 | Determan | |
| 2010/0028564 A1 | 2/2010 | Cheng | |
| 2010/0040842 A1 | 2/2010 | Everaerts | |
| 2010/0093878 A1 | 4/2010 | Yang | |
| 2010/0172028 A1 | 7/2010 | Kamei | |
| 2010/0279066 A1 * | 11/2010 | Bulliard | B82Y 30/00 428/141 |
| 2011/0281068 A1 | 11/2011 | David | |
| 2011/0318567 A1 | 12/2011 | Hildenbrand | |
| 2012/0192762 A1 | 8/2012 | Yabe | |
| 2012/0251778 A1 * | 10/2012 | Shimano | C09D 5/006 428/144 |
| 2013/0003179 A1 | 1/2013 | Vang | |
| 2016/0370506 A1 | 12/2016 | David | |

FOREIGN PATENT DOCUMENTS

| | | |
|---|---|---|
| JP | H 05-288903 | 11/1993 |
| JP | H 07-104103 | 4/1995 |
| JP | 2005-250309 | 9/2005 |
| WO | WO 1995/17303 | 6/1995 |
| WO | WO 1995/17691 | 6/1995 |
| WO | WO 1995/17692 | 6/1995 |
| WO | WO 1995/17699 | 6/1995 |
| WO | WO 1996/19347 | 6/1996 |
| WO | WO 1997/01440 | 1/1997 |
| WO | WO 1999/36248 | 7/1999 |
| WO | WO 1999/36262 | 7/1999 |
| WO | WO 2008/128073 | 10/2008 |
| WO | WO 2009/114683 | 9/2009 |
| WO | WO 2010/078071 | 7/2010 |
| WO | WO 2010/078346 | 7/2010 |
| WO | WO 2011/109284 | 9/2011 |
| WO | WO 2012/125247 | 9/2012 |
| WO | WO 2012/125324 | 9/2012 |
| WO | WO 2013/116103 | 8/2013 |

OTHER PUBLICATIONS

Extended European Search Report for EP Application No. 15163705.5; date of completion of report, Jul. 20, 2015.
Extended European Search Report for EP Application No. 15163703.0; date of completion of report, Jul. 17, 2015.
Bernhard, "A Corneal Nipple Pattern in Insect Compound Eyes", Acta Physiol. Scand., Nov. 1962, vol. 56, No. 3-4, pp. 385-386.
Campbell, "Improved Barrier Properties with Metallized Films From Corona Process Improvements and From Copolymer Characteristics", 1998, Polymers, Laminations & Coatings Conference, TAPPI Proceedings, 1998, pp. 385-396.
Friedrich, "Corona, Spark and Combined UV and Ozone Modification of Polymer Films WeBP23," Surface and Coatings Technology. 1998, vol. 98, pp. 879-885.
Gilbert, "Comparison of ITO Sputtering Process from Ceramic and Alloy Targets onto Room Temperature PET Substrates", Society of Vacuum Coaters, $36^{th}$ Annual Technical Conference Proceedings, 1993, pp. 236-241.
Hadobas, "Reflection Properties of Nanostructure-arrayed Silicon Surfaces", Nanotechnology, 2000, vol. 11, No. 3, pp. 161-164.
Kasugai, "High-Efficiency Nitride-Based Light-Emitting Diodes with Moth-eye Structure", Japanese Journal of Applied Physics, 2005, vol. 44, No. 10, pp. 7414-7417.
Koo, "A Snowman-like Array of Colloidal Dimers for Antireflecting Surfaces", Advanced Materials, Feb. 2004, vol. 16, No. 3, pp. 274-277.
Kuo, "Optimization of the Electron-Beam-Lithography Parameters for the Moth-Eye Effects of an Antireflection Matrix Structure," Journal of Applied Polymer Science, Dec. 15, 2006, vol. 102, No. 6, pp. 5303-5313.
Ma, "Preparation and Properties of Indium Tin Oxide Films Deposited on Polyester Substrates by Reactive Evaporation", Thin Solid Films, 1997, vol. 307, pp. 200-202.
Minami, "Physics of Very Thin IT0 Conducting Films with High Transparency Prepared by DC Magnetron Sputtering", Thin Solid Films, 1995, vol. 270, pp. 37-42.
Nakanishi, "Nano-patterning Using an Embedded Particle Monolayer as an Etch Mask", Microelectronic Engineering, 2006, vol. 83, pp. 1503-1508.
Skotheim, Handbook of Conducting Polymers, Second Edition, Marcel Dekker, Inc., pp. 7-12 (1998).
Wu, "Deformable Antireflection Coatings from Polymer and Nanoparticle Multilayers", Advanced Materials, Oct. 10, 2006, vol. 18, No. 20, pp. 2699-2702.
Yancey, "The Influence of Void Space on Antireflection Coatings of Silica Nanoparticle Self-assembled Films", Journal of Applied Physics, Feb. 2006, vol. 99, No. 3, pp. 034313-01-34313-10.
International Search Report for PCT International Application No. PCT/US2012/050592 dated Nov. 7, 2012, 3 pages.

\* cited by examiner

NANOSTRUCTURED ARTICLES AND METHODS TO MAKE THE SAME

CROSS REFERENCE TO RELATED APPLICATIONS

This application is a national stage filing under 35 U.S.C. 371 of PCT/US2012/050592, filed Aug. 13, 2012, which claims priority to U.S. Provisional Application Nos. 61/593,696, filed Feb. 1, 2012 and 61/524,406, filed Aug. 17, 2011, the disclosures of which are incorporated by reference in their entireties herein.

BACKGROUND

When light travels from one medium to another, some portion of the light is reflected from the interface between the two media. For example, typically about 4-5% of the light shining on a clear plastic substrate is reflected at the top surface.

The back lighting for mobile hand held and laptop devices are not effective to provide desired display quality in the presence of the reflection of the external lighting from the top surface and internal interfaces of the display devices, which in turn reduces contrast ratio and can downgrade viewing quality from the interfering image of external objects.

Different approaches have been employed to reduce the reflection of the top surface of display devices. One approach is to use antireflective coatings such as multilayer reflective coatings consisting of transparent thin film structures with alternating layers of contrasting refractive index to reduce reflection. However, it can be difficult to achieve broadband antireflection using the multilayer antireflective coating technology.

Another approach involves using subwavelength surface structure (e.g. subwavelength scale surface gratings) for broadband antireflection, wherein the phrase subwavelength is used to describe an object or structure having one or more dimensions smaller than the length of the wave with which the object or structure interacts. For suppression of Fresnel reflections from optical surfaces, subwavelength structured features lead to continuous-profile surface-relief grating as an effective medium to minimize reflection for a range of wavelengths greater than the subwavelength structured features on the surface. Methods for creating the subwavelength surface structure (e.g., by lithography) tend to be relatively complicated and expensive. Additionally, it can be challenging to obtain durable antireflection surfaces from the subwavelength scale surface gratings for front surface applications.

Antireflective and antiglare solutions had been developed to reduce the specular reflection of display devices. However, the hybrid antireflective antiglare surface has a structural dimension close to the wavelengths of the visible light spectrum and therefore can induce higher haze (i.e. >4%) to reduce display quality.

SUMMARY

A subwavelength structured surface gradient solution is therefore desired. Preferably, the solution provides a relatively low reflection (i.e., average reflection over the visible range less than 1 (in some embodiments, less than 0.5) percent) and durable characteristics to enhance the viewing quality of display devices.

In one aspect, the present disclosure describes a material comprising sub-micrometer particles dispersed in a polymeric matrix, wherein the material has a major surface, wherein the sub-micrometer particles have particle sizes of at least 75 nm (in some embodiments, in a range from 75 nm to 500 nm (in some embodiments, 100 nm 300 nm, or even 150 nm to 250 nm)), wherein a portion of the sub-micrometer particles protrude from the major surface by up to 90 (in some embodiments, 80, 70, 60, or even up to 50) percent of their respective particle sizes (in some embodiments, 80, 70, 60, or even up to 50) percent of their respective particle sizes (i.e., at least the specified percent from where the respective particle protrudes from the polymeric matrix), wherein the protruding sub-micrometer particles each have an exposed outer surface wherein less than 50 (in some embodiments, less than 40, 30, 25, 20, 15, 10, 5, or 1; or zero) percent of the exposed outer surface is covered by organic material. Optionally, the sub-micrometer particles are covalently bonded to the polymeric matrix. Optionally, at least some of the sub-micrometer particles are functionalized with at least one silane coupling agent (e.g., a silane coupling agent comprising at least one of monofunctional or multifunctional (e.g., difunctional) groups (e.g., acrylate, epoxy, silanol, or vinyl)).

In another aspect, the present disclosure describes a material comprising sub-micrometer particles dispersed in a polymeric matrix, wherein the material has a major surface, wherein the sub-micrometer particles have particle sizes of at least 75 nm (in some embodiments, in a range from 75 nm to 500 nm (in some embodiments, 100 nm 300 nm, or even 150 nm to 250 nm)), wherein a portion of the sub-micrometer particles protrude from the major surface in a range from 50 nm to 200 nm (in some embodiments, 75 nm to 175 nm, or even 100 nm to 150 nm), and wherein a portion of the sub-micrometer particles protrude from the major surface by up to 90 (in some embodiments, 80, 70, 60, or even up to 50) percent of their respective particle sizes. Optionally, the protruding sub-micrometer particles each have an exposed outer surface wherein less than 50 (in some embodiments, less than 40, 30, 25, 20, 15, 10, 5, or 1; or zero) percent of the exposed outer surface is covered by organic material. Optionally, the sub-micrometer particles are covalently bonded to the polymeric matrix. Optionally, at least some of the sub-micrometer particles are functionalized with at least one silane coupling agent (e.g., a silane coupling agent comprising at least one of monofunctional or multifunctional (e.g., difunctional) groups (e.g., acrylate, epoxy, silanol, or vinyl)).

In another aspect, the present disclosure describes a material comprising sub-micrometer particles dispersed in a polymeric matrix, wherein the material has a major surface, wherein a portion of the sub-micrometer particles protrude from the major surface by up to 90 (in some embodiments, 80, 70, 60, or even up to 50) percent of their respective particle sizes, and wherein the sub-micrometer particles are covalently bonded to the polymeric matrix. In some embodiments, the sub-micrometer particles have particle sizes of at least 20 nm (in some embodiments, in a range from 20 nm to 500 nm (in some embodiments, 75 nm to 500 nm, 100 nm 300 nm, or even 150 nm to 250 nm)). Optionally, at least some of the sub-micrometer particles are functionalized with at least one silane coupling agent (e.g., a silane coupling agent comprising at least one of monofunctional or multifunctional (e.g., difunctional) groups (e.g., acrylate, epoxy, silanol, or vinyl)).

In some embodiments, the average spacing (i.e. distance between the closest edges of two particles) between the protruding sub-micrometer particles is in a range from 5 nm to 300 nm (in some embodiments, 10 nm to 300 nm, 20 nm to 300 nm, 30 nm to 300 nm, 40 nm to 300 nm, 50 nm to 275 nm, 75 nm to 250 nm, or even 100 nm to 225 nm).

In some embodiments, materials described herein are in the form of a layer. In another aspect, the present disclosure describes an article comprising a substrate having first and second generally opposed major surfaces with a layer described herein on the first major surface.

In another aspect, the present disclosure provides a method of making material or article described herein, the method comprising:
  providing a layer comprising sub-micrometer particles dispersed in a polymeric precursor matrix;
  at least one of drying or curing the layer; and
  etching the at least one of dried or cured layer, as applicable, to provide the material or article.

Optionally, articles described herein further comprise a functional layer (i.e., at least one of a transparent conductive layer or a gas barrier layer) disposed between the first major surface of a substrate and a layer of material described herein. Optionally, articles described herein further comprise a functional layer (i.e., at least one of a transparent conductive layer or a gas barrier layer) disposed on a layer of material described herein.

Optionally, articles described herein further comprise a (second) layer of material (including a described herein and those described in PCT Appl. Nos. US2011/026454, filed Feb. 28, 2011, and US. Pat. Appl. Nos. 61/452,403 and 61/452,430, filed Mar. 14, 2011, the disclosures of which are incorporated herein by reference) on the second major surface of a substrate. Optionally, articles described herein further comprise a functional layer (i.e., at least one of a transparent conductive layer or a gas barrier layer) disposed between the second major surface of a substrate and a (second) layer of material. Optionally, articles described herein further comprise a functional layer (i.e., at least one of a transparent conductive layer or a gas barrier layer) disposed on a (second) layer of material.

When light enters multilayer substrates, the reflectivity of the light undergoes a period change according to the wavelength of the incident light. The reflection behavior with specific repeating period is referred to as an interference fringe. The greater the difference in the index of refraction among the layers, the greater the intensity and appearance of the interference pattern. The interference fringe tends to be particularly more sensitive to multilayer antireflective coatings utilizing the difference in refractive index among different layers to reduce reflectivity. However, the subwavelength structured surfaces described herein tend to form effective refractive index gradients to reduce reflectivity and minimize the interference fringe caused by mismatch in refractive index among different layers from multilayer antireflective coatings.

Articles described herein can be used, for example, for creating high performance, low fringing, antireflective optical articles. When a functional layer (i.e., at least one of a transparent conductive layer or a gas barrier layer) is disposed on a layer of material described herein, articles described herein may have significantly enhanced optical performance.

Embodiments of articles described herein are useful for numerous applications including display applications (e.g., liquid crystal displays (LCD), light emitting diode (LED) displays, or plasma displays); light extraction; electromagnetic interference (EMI) shielding, ophthalmic lenses; face shielding lenses or films; window films; antireflection for construction applications; and construction applications or traffic signs. Articles described herein are also useful for solar applications (e.g., solar films). They may also be useful, for example, as the front surface of solar thermal hot liquid/air heat panels or any solar energy absorbing device; for solar thermal absorbing surfaces having micro- or macro-columns with additional nano-scale surface structure; for the front surface of flexible solar photovoltaic cells made with amorphous silica photovoltaic cells or copper-indium-gallium-selenide (CIGS) photovoltaic cells; and for the front surface of a film applied on top of flexible photovoltaic cells

DETAILED DESCRIPTION

Figure 1:
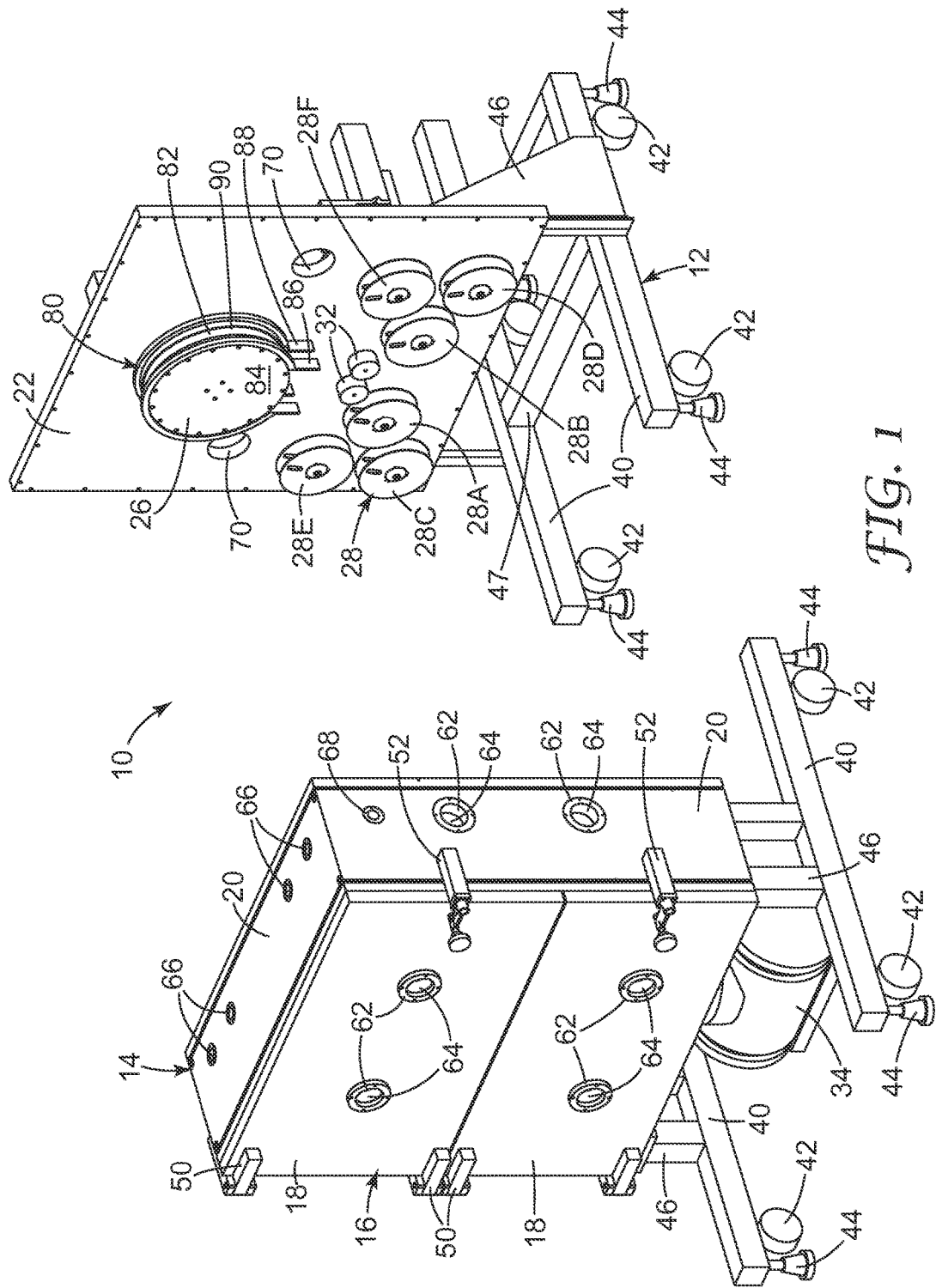
FIG. 1 is a first perspective view of a coating apparatus useful in the present disclosure.

The matrix (i.e., the continuous phase) of the materials described herein comprising the sub-micrometer particles dispersed in the polymeric precursor matrix, can comprise, for example, polymeric material, liquid resins, inorganic material, or alloys or solid solutions (including miscible polymers). The matrix may comprise, for example, cross-linked material (e.g., cross-linked material was made by cross-linking at least one of cross-linkable materials multi (meth)acrylate, polyester, epoxy, fluoropolymer, urethane, or siloxane (which includes blends or copolymers thereof)) or thermoplastic material (e.g., at least one of polycarbonate, poly(meth)acrylate, polyester, nylon, siloxane, fluoropolymer, urethane, cyclic olefin copolymer, triacetate cellulose, or diacrylate cellulose (which includes blends or copolymers thereof)). In some embodiments, the polymeric precursor matrix comprises at least one of tetrafluoroethylene, vinylfluoride, vinylidene fluoride, chlorotrifluoroethylene, perfluoroakoxy, fluorinated ethylene-propylene, ethylenetetrafluoroethylene, ethylenechlorotrifluoroethylene, perfluoropolyether, perfluoropolyoxetane, hexafluoropropylene oxide, siloxane, organosilicon, siloxides, silyl halides, ethylene oxide, propylene oxide, hydroxyl, hydroxylamine, carboxylic acid, —COONa, —SO$_3$Na, —CONHCH$_3$, —CON(CH$_2$CH$_3$)$_2$, acrylamide, amine, ether, sulfonate, acrylic acid, maleic anhydride, vinyl acid, vinyl alcohol, vinylpyridine, vinypyrrolidone, acetylene, pyrrole, thiophene, aniline, phenylene sulfide, or imidazole.

Useful polymeric materials include thermoplastics and thermosetting resins. Suitable thermoplastics include polyethylene terephthalate (PET), polystyrene, acrylonitrile butadiene styrene, polyvinyl chloride, polyvinylidene chloride, polycarbonate, polyacrylates, thermoplastic polyurethanes, polyvinyl acetate, polyamide, polyimide, polypropylene, polyester, polyethylene, poly(methyl methacrylate), poly(ethylene naphthalate), styrene acrylonitrile, silicone-polyoxamide polymers, triacetate cellulose, fluoropolymers, cyclic olefin copolymers, and thermoplastic elastomers.

Suitable thermosetting resins include allyl resin (including (meth)acrylates, polyester acrylates, urethane acrylates, epoxy acrylates and polyether acrylates), epoxies, thermosetting polyurethanes, and silicones or polysiloxanes. These resins can be formed from the reaction product of polymerizable compositions comprising the corresponding monomers or oligomers.

In some exemplary embodiments, the polymerizable compositions include at least one monomeric or oligomeric (meth)acrylate, preferably a urethane (meth)acrylate. Typically, the monomeric or oligomeric (meth)acrylate is multi (meth)acrylate. The term "(meth)acrylate" is used to designate esters of acrylic and methacrylic acids, and "multi (meth)acrylate" designates a molecule containing more than one (meth)acrylate group, as opposed to "poly(meth)acrylate" which commonly designates (meth)acrylate polymers. Most often, the multi(meth)acrylate is a di(meth)acrylate, but it is also contemplated, for example, to employ tri(meth) acrylates and tetra(meth)acrylates.

Suitable monomeric or oligomeric (meth)acrylates include alkyl(meth)acrylates, (e.g., methyl(meth)acrylate, ethyl(meth)acrylate, 1-propyl(meth)acrylate, and t-butyl (meth)acrylate). The acrylates may include (fluoro)alkylester monomers of (meth)acrylic acid, the monomers being partially or fully fluorinated (e.g., trifluoroethyl(meth)acrylate).

Examples of commercially available multi(meth)acrylate resins include those from Mitsubishi Rayon Co., Ltd., Tokyo, Japan, under the trade designation "DIABEAM"; from Nagase & Company, Ltd., New York, N.Y., under the trade designation "DINACOL"; Shin-Nakamura Chemical Co., Ltd., Wakayama, Japan, under the trade designation "NK ESTER"; Dainippon Ink & Chemicals, Inc, Tokyo, Japan, under the trade designation "UNIDIC; Toagosei Co., Ltd., Tokyo, Japan, under the trade designation "ARONIX"; NOF Corp., White Plains, N.Y., under the trade designation "BLENMER"; Nippon Kayaku Co., Ltd., Tokyo, Japan, under the trade designation "KAYARAD"; and Kyoeisha Chemical Co., Ltd., Osaka, Japan, under the trade designations "LIGHT ESTER" and "LIGHT ACRYLATE".

Oligomeric urethane multi(meth)acrylates are commercially available, for example, from Sartomer, Exton, Pa., under the trade designation "PHOTOMER 6000 Series" (e.g., "PHOTOMER 6010" and "PHOTOMER 6020") and "CN 900 Series" (e.g., "CN966B85", "CN964", and "CN972"). Oligomeric urethane (meth)acrylates are also available, for example, from Cytec Industries Inc., Woodland Park, N.J., under the trade designations "EBECRYL 8402", "EBECRYL 8807," and "EBECRYL 4827". Oligomeric urethane (meth)acrylates may also be prepared by the initial reaction of an alkylene or aromatic diisocyanate of the formula OCN—$R_3$—NCO with a polyol. Typically, the polyol is a diol of the formula HO—$R_4$—OH where $R_3$ is a C2-C100 alkylene or an arylene group and $R_4$ is a C2-C100 alkylene group. The intermediate product is then a urethane diol diisocyanate, which subsequently can undergo reaction with a hydroxyalkyl(meth)acrylate. Suitable diisocyanates include 2,2,4-trimethylhexylene diisocyanate and toluene diisocyanate. Alkylene diisocyanates are generally preferred. A particularly preferred compound of this type may be prepared from 2,2,4-trimethylhexylene diisocyanate, poly(caprolactone)diol and 2-hydroxyethyl methacrylate. In at least some cases, the urethane (meth)acrylate is preferably aliphatic.

The polymerizable compositions can be mixtures of various monomers or oligomers, having the same or differing reactive functional groups. Polymerizable compositions comprising at least two different functional groups may be used, including (meth)acrylate, epoxy and urethane. The differing functionality may be contained in different monomeric or oligomeric moieties or in the same monomeric or oligomeric moiety. For example, a resin composition may comprise an acrylic or urethane resin having an epoxy group or a hydroxyl group in the side chain, a compound having an amino group and, optionally, a silane compound having an epoxy group or amino group in the molecule.

The thermosetting resin compositions are polymerizable using conventional techniques such as thermal cure, photocure (cure by actinic radiation), or e-beam cure. In one embodiment, the resin is photopolymerized by exposing it to ultraviolet (UV) or visible light. Conventional curatives or catalysts may be used in the polymerizable compositions and are selected based on the functional group(s) in the composition. Multiple curatives or catalysts may be required if multiple cure functionality is being used. Combining one or more cure techniques, such as thermal cure, photocure, and e-beam cure, is within the scope of the present disclosure.

Furthermore, the polymerizable resins can be compositions comprising at least one other monomer or oligomer (i.e., other than those described above, namely the monomeric or oligomeric (meth)acrylate and the oligomeric urethane (meth)acrylate). This other monomer may reduce viscosity and/or improve thermomechanical properties and/or increase refractive index. Monomers having these properties include acrylic monomers (i.e., acrylate and methacrylate esters, acrylamides, and methacrylamides), styrene monomers, and ethylenically unsaturated nitrogen heterocycles.

(Meth)acrylate esters having other functionalities are also useful. Exemplary compounds of this type include 2-(N-butylcarbamyl)ethyl(meth)acrylates, 2,4-dichlorophenyl acrylate, 2,4,6-tribromophenyl acrylate, tribromophenoxylethyl acrylate, t-butylphenyl acrylate, phenyl acrylate, phenyl thioacrylate, phenylthioethyl acrylate, alkoxylated phenyl acrylate, isobornyl acrylate, and phenoxyethyl acrylate. The reaction product of tetrabromobisphenol A di-epoxide and (meth)acrylic acid is also useful.

Other exemplary monomers include a polyol multi(meth) acrylate. Such compounds are typically prepared from aliphatic diols, triols, and/or tetraols containing 2-10 carbon atoms. Examples of suitable poly(meth)acrylates are ethylene glycol diacrylate, 1,6-hexanediol diacrylate, 2-ethyl-2-hydroxymethyl-1,3-propanediol triacrylate (trimethylolpropane triacrylate), di(trimethylolpropane)tetraacrylate, pentaerythritol tetraacrylate, the corresponding methacrylates and the (meth)acrylates of alkoxylated (usually ethoxylated) derivatives of said polyols. Monomers having at least two ethylenically unsaturated groups can serve as a crosslinker.

Styrenic compounds suitable for use as the other monomer include styrene, dichlorostyrene, 2,4,6-trichlorostyrene, 2,4,6-tribromostyrene, 4-methylstyrene, and 4-phenoxystyrene. Ethylenically unsaturated nitrogen heterocycles (e.g., N-vinylpyrrolidone and vinylpyridine) are also useful.

Constituent proportions in the radiation curable materials can vary. In general, the organic component can comprise about 30-100% monomeric or oligomeric (meth)acrylate or oligomeric urethane multi(meth)acrylate, with any balance being the other monomer or oligomer.

Surface leveling agents may be added to the matrix. The leveling agent is preferably used for smoothing the matrix resin. Examples include silicone-leveling agents, acrylic-leveling agents and fluorine-containing-leveling agents. In one embodiment, the silicone-leveling agent includes a polydimethyl siloxane backbone to which polyoxyalkylene groups are added.

Optionally, in some embodiments, the polymeric matrix may comprise particles less than 50 nm in size such as metal oxides (e.g., $SiO_2$, $ZrO_2$, $TiO_2$, ZnO, magnesium silicate, indium tin oxide, and antimony tin oxide). Addition of metal oxides has been observed to enhance the mechanical durability of the polymeric matrix (e.g., abrasion resistance).

The polymeric matrix can be made from functionalized polymeric materials such as weatherable polymeric materials, hydrophobic polymeric materials, hydrophilic polymeric materials, antistatic polymeric materials, antistaining polymeric materials, conductive polymeric materials for electromagnetic shielding, antimicrobial polymeric materials, or antiwearing polymeric materials. Examples of weatherable polymeric materials include the crosslinkable acrylic modified fluoropolymers based on vinylidene fluoride polymers (see, e.g., U.S. Pat. No. 6,680,357B2 (Hedhli et al)), the crosslinkable fluoropolymers (see, e.g., U.S. Pat. Appl. Pub. No. US20100093878A1 (Yang et al)), and crosslinkable fluoropolymer available, for example, under the trade designation "LUMIFLON" from Asahi Glass Co., Tokyo, Japan. Functional hydrophilic or antistatic polymeric matrix comprises the hydrophilic acrylates such as hydroxyethyl methacrylate (HEMA), hydroxyethyl acrylate (HEA), poly (ethylene glycol) acrylates (PEGA) with different PEG molecular weights, and other hydrophilic acrylates (e.g., 3-hydroxy propyl acrylate, 3-hydroxy propyl methacrylate, 2-hydroxy-3-methacryloxy propyl acrylate and 2-hydroxy-3-acryloxy propyl acrylate). Other functional polymeric matrices include semiconducting conjugative polymers such as poly(acrylene ethylene) and its derivatives, stimuli-responsive polymers, and supramolecular metallopolymers.

Optionally, the functional polymeric matrix can comprise nano fillers to provide antiwearing, antimicrobial, antistaining, or EMI functionalities.

Sub-micrometer particles dispersed in the matrix have a largest dimension less than 1 micrometer. Sub-micrometer particles include nanoparticles (e.g., nanospheres, and nanocubes). The sub-micrometer particles can be associated or unassociated or both.

In some embodiments, the sub-micrometer particles are in a range from 75 nm to 500 nm (in some embodiments, 100 nm, 300 nm, or even 150 nm to 250 nm). Nanoparticles have a mean diameter in the range from about 75 nm to about 500 nm. The term "nanoparticle" can be further defined herein to mean colloidal (primary particles or associated particles) with a diameter less than about 500 nm. The term "associated particles" as used herein refers to a grouping of two or more primary particles that are aggregated and/or agglomerated. The term "aggregated" as used herein is descriptive of a strong association between primary particles which may be chemically bound to one another. The breakdown of aggregates into smaller particles is difficult to achieve. The term "agglomerated" as used herein is descriptive of a weak association of primary particles which may be held together by charge or polarity and can be broken down into smaller entities. The term "primary particle size" is defined herein as the size of a non-associated single particle. The dimension or size of the nano-scale dispersed phase can be determined by electron microscopy (e.g., transmission electron microscopy (TEM)).

The sub-micrometer (including nanosized) particles can comprise carbon, metals, metal oxides (e.g., $SiO_2$, $ZrO_2$, $TiO_2$, ZnO, magnesium silicate, indium tin oxide, and antimony tin oxide), carbides (e.g., SiC and WC), nitrides, borides, halides, fluorocarbon solids (e.g., poly(tetrafluoroethylene)), carbonates (e.g., calcium carbonate), and mixtures thereof. In some embodiments, sub-micrometer particles comprises at least one of $SiO_2$ particles, $ZrO_2$ particles, $TiO_2$ particles, ZnO particles, $Al_2O_3$ particles, calcium carbonate particles, magnesium silicate particles, indium tin oxide particles, antimony tin oxide particles, poly(tetrafluoroethylene) particles, or carbon particles. Metal oxide particles can be fully condensed. Metal oxide particles can be crystalline.

Typically, particles are present in the matrix in an amount in a range from about 10 wt. % to about 85 wt. % (in some embodiments, about 30 wt. % to about 80 wt. %, or even about 40 wt. % to about 70 wt. %), although amounts outside these ranges may also be useful.

In some embodiments, the sub-micrometer particles have a bimodal distribution.

Exemplary silicas are commercially available, for example, from Nalco Chemical Co., Naperville, Ill., under the trade designation "NALCO COLLOIDAL SILICA," such as products 2329, 2329K, and 2329 PLUS. Exemplary fumed silicas include those commercially available, for example, from Evonik Degusa Co., Parsippany, N.J., under the trade designation, "AEROSIL series OX-50", as well as product numbers-130, -150, and -200; and from Cabot Corp., Tuscola, Ill., under the designations "CAB-O-SPERSE 2095", "CAB-O-SPERSE A105", and "CAB-O-SIL M5". Other exemplary colloidal silica are available, for example, from Nissan Chemicals under the designations "MP1040", "MP2040", "MP3040", and "MP4040".

In some embodiments, the sub-micrometer particles are surface modified. Preferably, the surface-treatment stabilizes the sub-micrometer particles so that the particles are well dispersed in the polymerizable resin, and result in a substantially homogeneous composition. The sub-micrometer particles can be modified over at least a portion of its surface with a surface treatment agent so that the stabilized particles can copolymerize or react with the polymerizable resin during curing.

In some embodiments, the sub-micrometer particles are treated with a surface treatment agent. In general, a surface treatment agent has a first end that will attach to the particle surface (covalently, ionically or through strong physisorption) and a second end that imparts compatibility of the particle with the resin and/or reacts with the resin during curing. Examples of surface treatment agents include alcohols, amines, carboxylic acids, sulfonic acids, phosphonic acids, silanes, and titanates. The preferred type of treatment agent is determined, in part, by the chemical nature of the metal oxide surface. Silanes are preferred for silica and other for siliceous fillers. Silanes and carboxylic acids are preferred for metal oxides, such as zirconia. The surface modification can be done either subsequent to mixing with the monomers or after mixing. It is preferred in the case of silanes to react the silanes with the particles or nanoparticle surface before incorporation into the resins. The required amount of surface modifier is dependent on several factors such as particle size, particle type, molecular weight of the modifier, and modifier type.

Representative embodiments of surface treatment agents include compounds such as isooctyl tri-methoxy-silane, N-(3-triethoxysilylpropyl)methoxyethoxy-ethoxyethyl carbamate (PEG3TES), N-(3-triethoxysilylpropyl)methoxyethoxyethoxyethyl carbamate (PEG2TES), 3-(methacryloyloxy)propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, vinyldimethylethoxysilane, pheyltrimethaoxysilane, n-octyltrimethoxysilane, dodecyltrimethoxysilane, octadecyltrimethoxysilane, propyltrimethoxysilane, hexyltrimethoxysilane, vinylmethyldiactoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-(2-(2-methoxyethoxy)ethoxy)acetic acid (MEEAA), beta-carboxyethylacrylate, 2-(2-methoxyethoxy)acetic acid, methoxyphenyl acetic acid, and mixtures thereof. One exemplary silane surface modifier is commercially available, for example, from OSI Specialties, Crompton South Charleston, W. Va., under the trade designation "SILQUEST A1230". For monofunctional silane coupling agents comprising silanol groups, the silane agents can react and form covalent bonds with the hydroxyl groups on the surface of nanopartilces. For bi or multifunctional silane coupling agents comprising silanol groups and other functional groups (e.g., acrylate, epoxy, and/or vinyl), the silane agents can react and form covalent bonds with the hydroxyl groups on the surface of nanoparticles and the functional groups (e.g., acrylate, epoxy, and/or vinyl) in the polymeric matrix.

Surface modification of the particles in the colloidal dispersion can be accomplished in a variety of ways. The process involves the mixture of an inorganic dispersion with surface modifying agents. Optionally, a co-solvent can be added at this point, such as 1-methoxy-2-propanol, ethanol, isopropanol, ethylene glycol, N,N-dimethylacetamide, and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing. In one method, the mixture can be reacted at about 85° C. for about 24 hours, resulting in the surface modified sol. In another method, where metal oxides are surface modified, the surface treatment of the metal oxide can preferably involve the adsorption of acidic molecules to the particle surface. Surface modification of the heavy metal oxide preferably takes place at room temperature.

Surface modification of $ZrO_2$ with silanes can be accomplished under acidic conditions or basic conditions. In one example, the silanes are heated under acid conditions for a suitable period of time. At which time the dispersion is combined with aqueous ammonia (or other base). This method allows removal of the acid counter ion from the $ZrO_2$ surface as well as reaction with the silane. In another method, the particles are precipitated from the dispersion and separated from the liquid phase.

A combination of surface modifying agents can be useful, for example, wherein at least one of the agents has a functional group co-polymerizable with a crosslinkable resin. For example, the polymerizing group can be ethylenically unsaturated or a cyclic group subject to ring opening polymerization. An ethylenically unsaturated polymerizing group can be, for example, an acrylate or methacrylate, or vinyl group. A cyclic functional group subject to ring opening polymerization generally contains a heteroatom, such as oxygen, sulfur, or nitrogen, and preferably a 3-membered ring containing oxygen (e.g., an epoxide).

Exemplary substrates include polymeric substrates, glass substrates or windows, and functional devices (e.g., organic light emitting diodes (OLEDs), displays, and photovoltaic devices). Typically, the substrates have thicknesses in a range from about 12.7 micrometers (0.0005 inch) to about 762 micrometers (0.03 inch), although other thicknesses may also be useful.

Exemplary polymeric materials for the substrates include polyethylene terephthalate (PET), polystyrene, acrylonitrile butadiene styrene, polyvinyl chloride, polyvinylidene chloride, polycarbonate, polyacrylates, thermoplastic polyurethanes, polyvinyl acetate, polyamide, polyimide, polypropylene, polyester, polyethylene, poly(methyl methacrylate), polyethylene naphthalate, styrene acrylonitrile, silicone-polyoxamide polymers, fluoropolymers, triacetate cellulose, cyclic olefin copolymers, and thermoplastic elastomers. Semicrystalline polymers (e.g., polyethylene terephthalate (PET)) may be particularly desirable for the applications requiring good mechanical strength and dimensional stability. For other optical film applications, low birefringence polymeric substrates, such as triacetate cellulose, poly(methyl methacrylate), polycarbonate, and cyclic olefin copolymers, may be particularly desirable to minimize or avoid orientation induced polarization or dichroism interference with other optical components, such as polarizer, electromagnetic interference, or conductive touch functional layer in the optical display devices.

The polymeric substrates can be formed, for example, by melt extrusion casting, melt extrusion calendaring, melt extrusion with biaxial stretching, blown film processes, and solvent casting optionally with biaxial stretching. In some embodiments, the substrates are highly transparent (e.g., at least 90% transmittance in the visible spectrum) with low haze (e.g., less than 1%) and low birefringence (e.g., less than 50 nanometers optical retardance). In some embodiments, the substrates have a microstructured surface or fillers to provide hazy or diffusive appearance.

In some embodiments, materials described herein have a change in reflection from the Durability Test of less than 2 (in some embodiments, less than 1, 0.75, 0.5, or even less than 0.25; or even zero) percent.

The percent to of a sub-micrometer particle protruding from the major surface can be determined by viewing a cross-section of an article described herein with a scanning electron microscope or transmission electron microscope. The percent of a sub-micrometer particle that protrudes from the major surface is the specified percent from where the respective particle protrudes from the polymeric matrix, Optionally, the substrate is a polarizer (e.g., a reflective polarizer or an absorptive polarizer). A variety of polarizer films may be used as the substrate, including multilayer optical films composed, for example, of some combination of all birefringent optical layers, some birefringent optical layers, or all isotropic optical layers. The multilayer optical films can have ten or less layers, hundreds, or even thousands of layers. Exemplary multilayer polarizer films include those used in a wide variety of applications such as liquid crystal display devices to enhance brightness and/or reduce glare at the display panel. The polarizer film may also be the type used in sunglasses to reduce light intensity and glare. The polarizer film may comprise a polarizer film, a reflective polarizer film, an absorptive polarizer film, a diffuser film, a brightness enhancing film, a turning film, a mirror film, or a combination thereof. Exemplary reflective polarizer films include those reported in U.S. Pat. No. 5,825,543 (Ouderkirk et al.) U.S. Pat. No. 5,867,316 (Carlson et al.), U.S. Pat. No. 5,882,774 (Jonza et al.), U.S. Pat. No. 6,352,761 B1 (Hebrink et al.), U.S. Pat. No. 6,368,699 B1 (Gilbert et al.), and U.S. Pat. No. 6,927,900 B2 (Liu et al.), U.S. Pat. Appl. Pub. Nos. 2006/0084780 A1 (Hebrink et al.), and 2001/0013668 A1 (Neavin et al.), and PCT Pub. Nos. WO95/17303 (Ouderkirk et al.), WO95/17691 (Ouderkirk et al), WO95/17692 (Ouderkirk et al.), WO95/17699 (Ouderkirk et al.), WO96/19347 (Jonza et al.), WO97/01440 (Gilbert et al.), WO99/36248 (Neavin et al.), and WO99/36262 (Hebrink et al.), the disclosures of which are incorporated herein by reference. Exemplary reflective polarizer films also include those commercially available from 3M Company, St. Paul, Minn., under the trade designations "VIKUITI DUAL BRIGHTNESS ENHANCED FILM (DBEF)", "VIKUITI BRIGHTNESS ENHANCED FILM (BEF)", "VIKUITI DIFFUSE REFLECTIVE POLARIZER FILM (DRPF)", "VIKUITI ENHANCED SPECULAR REFLECTOR (ESR)", and "ADVANCED POLARIZER FILM (APF)". Exemplary absorptive polarizer films are commercially available, for example, from Sanritz Corp., Tokyo, Japan, under the trade designation of "LLC2-5518SF".

The optical film may have at least one non-optical layer (i.e., a layer(s) that does not significantly participate in the determination of the optical properties of the optical film). The non-optical layers may be used, for example, to impart or improve mechanical, chemical, or optical, properties; tear or puncture resistance; weatherability; or solvent resistance.

Exemplary glass substrates include sheet glass (e.g., soda-lime glass) such as that made, for example, by floating molten glass on a bed of molten metal. In some embodiments (e.g., for architectural and automotive applications), it may be desirable to include a low-emissivity (low-E) coating on a surface of the glass to improve the energy efficiency of the glass. Other coatings may also be desirable in some embodiments to enhance the electro-optical, catalytic, or conducting properties of glass.

Materials described herein having articles described herein comprising the sub-micrometer particles dispersed in the polymeric matrix can exhibit at least one desirable property, such as antireflective properties, light absorbing properties, antifogging properties, improved adhesion, and durability.

For example, in some embodiments, the surface reflectivity of the sub-micrometer structured surface is about 50% or less than the surface reflectivity of an untreated surface. As used herein with respect to comparison of surface properties, the term "untreated surface" means the surface of an article comprising the same matrix material and the same sub-micrometer dispersed phase (as the sub-micron structured surface to which it is being compared), but without a sub-micron structured surface.

Some embodiments further comprise a layer or coating comprising, for example, ink, encapsulant, adhesive, or metal attached to the surface of the material comprising sub-micrometer particles dispersed in a polymeric matrix. The layer or coating can have improved adhesion to the surface than to an untreated surface. Ink or encapsulant coatings can be applied on the substrates, for example, by solvent, electrostatic deposition, and powder printing processes and cured by UV radiation or thermal treatment. Pressure sensitive adhesives or structural adhesives can be applied on the substrates, for example, by solvent and hot melt coating processes. For metallization of plastics, the surface is typically pre-treated by oxidation and coated with electroless copper or nickel before further plating with silver, aluminum, gold, or platinum. For vacuum metallization, the process typically involves heating (e.g., resistance, electron beam, or plasma heating) the coating metal to its boiling point in a vacuum chamber, then letting condensation deposit the metal on the substrate's surface.

For articles described herein, the first layer and optional second layer of material comprising sub-micrometer particles dispersed in a polymeric matrix independently have a thickness of at least 500 nm (in some embodiments, at least 1 micrometer, 1.5 micrometer, 2 micrometer, 2.5 micrometers, 3 micrometers, 4 micrometers, 5 micrometers, 7.5 micrometers, or even at least 10 micrometers).

A coating comprising matrix and a sub-micrometer particle dispersed phase can be coated on the substrates and cured using methods known in the art (e.g., UV cured by casting on a drum, die coating, flow coating, or dip coating). The coating can be prepared in any desired thickness up to 0.5 micrometer (in some embodiments, up to 0.4 micrometer, 0.3 micrometer, 0.25 micrometer, 0.2 micrometer, 0.15 micrometer, 0.1 micrometer, or even up to 0.075 micrometer). In addition, the coating can be cured by UV, electron beam, or heat. Etching at least a portion of the matrix and sub-micrometer particle dispersed phase using plasma can form the sub-micrometer structured surface. The methods can be carried out at moderate vacuum conditions (e.g., in a range from about 5 mTorr to about 1000 mTorr) or atmospheric pressure environment.

A typical vacuum plasma system consists of a vacuum chamber with two parallel electrodes, the "powered electrode" (or "sample carrier electrode") and the counter-electrode, which creates an electric field that accelerates ions toward. The powered electrode is located in the bottom portion of the chamber and is electrically isolated from the rest of the chamber. The article or sample to be sub-micrometer structured is placed on the powered electrode. Plasma gas species can be added to the chamber, for example, through small inlets in the top of the chamber and can exit to the vacuum pump system at the bottom of the chamber. Plasma is formed in the system by applying a RF electromagnetic field to the powered electrode. The field is typically produced using a 13.56 MHz oscillator, although other RF sources and frequency ranges may be used. The gas molecules are energized and can become ionized in the plasma and accelerated toward the powered electrode to etch the sample. The large voltage difference causes the ions to be directed toward the powered electrode where they collide with the sample to be etched. Preferably, the etching is to a depth from 75 nm to 175 nm.

The process pressure is typically maintained at about 5 to 1000 mTorr, but greater than about 1 mTorr. This pressure range is very conducive for generation of the sub-micron structure in a cost effective manner.

The power density of the RF power of the etching process is preferably in the range of about 0.1 watt/cm$^3$ to about 1 watt/cm$^3$ (in some embodiments, about 0.2 watts/cm$^3$ to about 0.3 watt/cm$^3$).

The type and amount of gas utilized will depend upon the matrix material to be etched. The reactive gas species need to selectively etch the matrix material rather than the sub-micrometer particle dispersed phase. Additional gases may be used for enhancing the etching rate of hydrocarbons or for the etching of non-hydrocarbon materials. For example, fluorine containing gases (e.g., perfluoromethane, perfluoroethane, perfluoropropane, sulfurhexafluoride, and nitrogen trifluoride) can be added to oxygen or introduced by themselves to etch materials such as $SiO_2$, tungsten carbide, silicon nitride, and amorphous silicon. Chlorine-containing gases can likewise be added for the etching of materials such as aluminum, sulfur, boron carbide, and semiconductors from the Group II-VI (including cadmium, magnesium, zinc, sulfur, selenium, tellurium, and combinations thereof and from the Group III-V (including aluminum, gallium, indium, arsenic, phosphorous, nitrogen, antimony, or combinations thereof. Hydrocarbon gases (e.g., methane) can be used for the etching of materials (e.g., gallium arsenide, gallium, and indium). Inert gases, particularly heavy gases such as argon can be added to enhance the etching process.

Methods for making sub-micrometer structured surfaces described herein can also be carried out using a continuous roll-to-roll process. For example, the method can be carried out using "cylindrical" plasma etching (PE). Cylindrical plasma etching (PE) utilizes a rotating cylindrical electrode to provide etched sub-micrometer structures on the surface of the article.

In general, cylindrical PE for making the sub-micron structured articles described herein can be described as follows. A rotatable cylindrical electrode ("drum electrode") powered by radio-frequency (RF) and a grounded counter-electrode are provided inside a vacuum vessel. The counter-electrode can comprise the vacuum vessel itself. Gas comprising an etchant is fed into the vacuum vessel, and a plasma is ignited and sustained between the drum electrode and the grounded counter-electrode. The conditions are selected so that sufficient ion bombardment is directed perpendicular to the circumference of the drum. A continuous article comprising the matrix containing the sub-micron particle dispersed phase can then be wrapped around the circumference of the drum and the matrix can be etched in the direction normal to the plane of the article. The matrix can be in the form of a coating on an article (e.g., on a film or web, or the matrix can be the article itself). The exposure time of the article can be controlled to obtain a predetermined etch depth of the resulting structure. The process can be carried out at an operating pressure of about 5-1000 mTorr.

Figure 2:
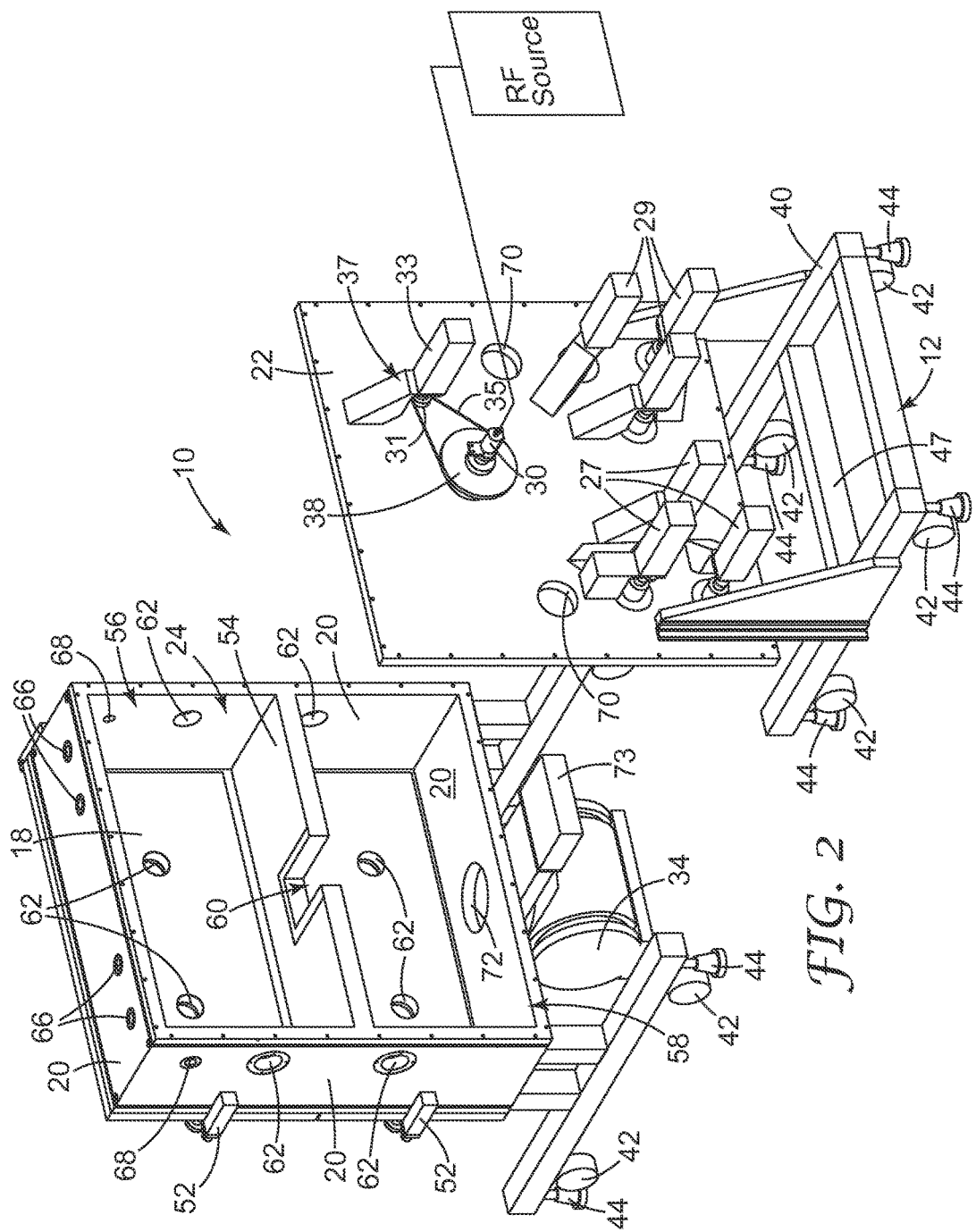
FIG. 2 is a second perspective view of the apparatus of FIG. 1 taken from a different vantage point.

FIGS. 1 and 2 illustrate a cylindrical PE apparatus that is useful for exemplary methods of making structured articles described herein. A common element for plasma creation and ion acceleration is generally indicated as 10. This PE apparatus 10 includes support structure 12, housing 14 including front panel 16 of one or more doors 18, side walls 20 and back plate 22 defining inner chamber 24 therein divided into one or more compartments, drum 26 rotatably affixed within the chamber, plurality of spool mechanisms rotatably affixed within the chamber and referred to generally as 28, drive assembly 37 for rotatably driving drum 26, idler rollers 32 rotatably affixed within the chamber, and vacuum pump 34 fluidly connected to the chamber.

Support structure 12 is any means known in the art for supporting housing 14 in a desired configuration, a vertically upright manner in the present case. As shown in FIGS. 1 and 2, housing 14 can be a two-part housing as described below in more detail. In this embodiment, support structure 12 includes cross supports 40 attached to each side of the two-part housing for supporting apparatus 10. Specifically, cross supports 40 include both wheels 42 and adjustable feet 44 for moving and supporting, respectively, apparatus 10. In the embodiment shown in FIGS. 1 and 2, cross supports 40 are attached to each side of housing 14 through attachment supports 46. Specifically, cross supports 40 are connected to one of side walls 20, namely the bottom side wall, via attachment supports 46, while cross supports 40 on the other side of housing 14 are connected to back plate 22 by attachment supports 46. An additional crossbar 47 is supplied between cross supports 40 on the right-hand side of apparatus 10 as shown in FIG. 1. This can provide additional structural reinforcement.

Housing 14 can be any means of providing a controlled environment that is capable of evacuation, containment of gas introduced after evacuation, plasma creation from the gas, ion acceleration, and etching. In the embodiment shown in FIGS. 1 and 2, housing 14 has outer walls that include front panel 16, four side walls 20, and back plate 22. The outer walls define a box with a hollow interior, denoted as chamber 24. Side walls 20 and back plate 22 are fastened together, in any manner known in the art, to rigidly secure side walls 20 and back plate 22 to one another in a manner sufficient to allow for evacuation of chamber 24, containment of a fluid for plasma creation, plasma creation, ion acceleration, and etching. Front panel 16 is not fixedly secured so as to provide access to chamber 24 to load and unload substrate materials and to perform maintenance. Front panel 16 is divided into two plates connected via hinges 50 (or an equivalent connection means) to one of side walls 20 to define a pair of doors 18. These doors seal to the edge of side walls 20, preferably through the use of a vacuum seal (e.g., an O-ring). Locking mechanisms 52 selectively secure doors 18 to side walls 20 and can be any mechanism capable of securing doors 18 to side walls 20 in a manner allowing for evacuation of chamber 24, storage of a fluid for plasma creation, plasma creation, ion acceleration, and etching.

In one embodiment, chamber 24 is divided by divider wall 54 into two compartments 56 and 58. Passage or hole 60 in wall 54 provides for passage of fluids or substrate between compartments. Alternatively, the chamber can be only one compartment or three or more compartments. Preferably, the chamber is only one compartment.

Housing 14 includes plurality of view ports 62 with high pressure, clear polymeric plates 64 sealably covering ports 62 to allow for viewing of the etching process occurring therein. Housing 14 also includes plurality of sensor ports 66 in which various sensors (e.g., temperature, pressure, etc.) can be secured. Housing 14 further includes inlet ports 68 providing for conduit connection through which fluid can be introduced into chamber 24 as needed. Housing 14 also includes pump ports 70 and 72 that allow gases and liquids to be pumped or otherwise evacuated from chamber 24.

Pump 34 is shown suspended from one of side walls 20, preferably the bottom (as shown in FIG. 2). Pump 34 can be, for example, a turbo-molecular pump fluidly connected to the controlled environment within housing 14. Other pumps, such as diffusion pumps or cryopumps, can be used to evacuate lower compartment 58 and to maintain operating pressure therein. Sliding valve 73 is positioned along this fluid connection and can selectively intersect or block fluid communication between pump 34 and the interior of housing 14. Sliding valve 73 is movable over pump port 62 so that pump port 62 can be fully open, partially open, or closed with respect to fluid communication with pump 34.

Drum 26 preferably is cylindrical electrode 80 with annular surface 82 and two planar end surfaces 84. The electrode can be made of any electrically conductive material and preferably is a metal (e.g., aluminum, copper, steel, stainless steel, silver, chromium, or an alloy thereof). Preferably, the electrode is aluminum, because of the ease of fabrication, low sputter yield, and low costs.

Drum 26 is further constructed to include non-coated, conductive regions that allow an electric field to permeate outward as well as non-conductive, insulative regions for preventing electric field permeation and thus for limiting film coating to the non-insulated or conductive portions of the electrode. The electrically non-conductive material typically is an insulator, such as a polymer (e.g., polytetrafluoroethylene). Various embodiments that fulfill this electrically non-conductive purpose so as to provide only a small channel, typically the width of the transparent conductive oxide substrate to be coated, as a conductive area can be envisioned by one of ordinary skill in the art.

FIG. 1 shows an embodiment of drum 26 where annular surface 82 and end surfaces 84 of drum 26 are coated with an electrically non-conductive or insulative material, except for annular channel 90 in annular surface 82 which remains uncoated and thus electrically conductive. In addition, pair of dark space shields 86 and 88 cover the insulative material on annular surface 82, and in some embodiments cover end surfaces 84. The insulative material limits the surface area of the electrode along which plasma creation and negative biasing may occur. However, since the insulative materials sometimes can become fouled by the ion bombardment, dark space shields 86 and 88 can cover part or all of the insulated material. These dark space shields may be made from a metal (e.g., aluminum), but do not act as conductive agents because they are separated from the electrode by means of an insulating material (not shown). This allows confinement of the plasma to the electrode area.

Figure 3:
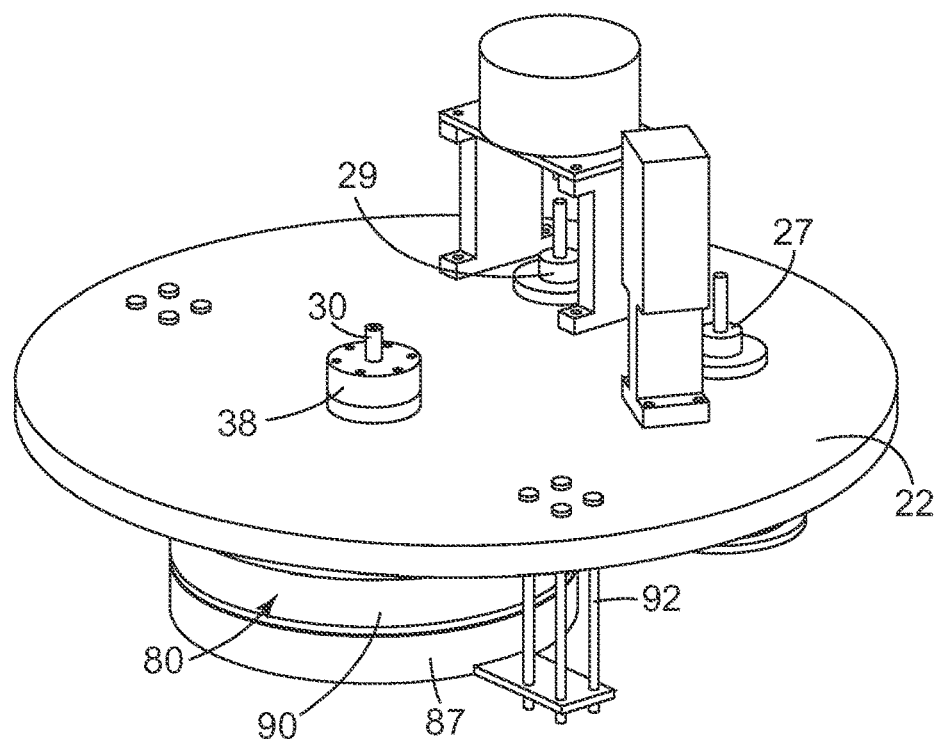
FIG. 3 is a perspective view of another embodiment of the coating apparatus removed from its gas containing chamber.
Figure 4:
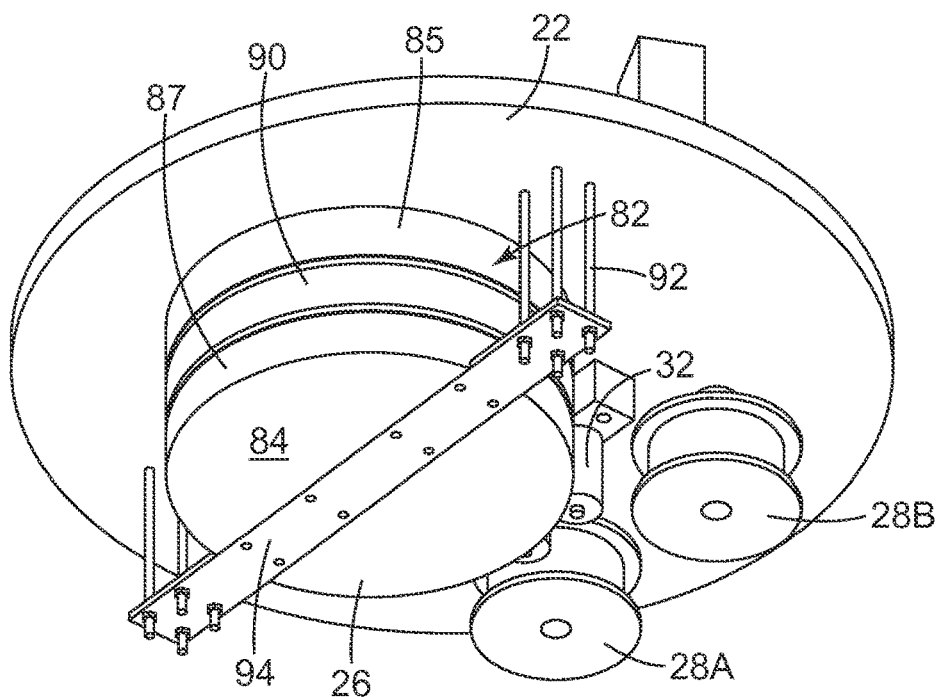
FIG. 4 is a second perspective view of the apparatus of FIG. 3 taken from a different vantage point.

Another embodiment of drum 26 is shown in FIGS. 3 and 4 where drum 26 includes pair of insulative rings 85 and 87 affixed to annular surface 82 of drum 26. In some embodiments, insulative ring 87 is a cap which acts to also cover end surface 84. Bolts 92 secure support means 94, embodied as a flat plate or strap, to back plate 22. Bolts 92 and support 94 can assist in supporting the various parts of drum 26. Pair of insulative rings 85 and 87, once affixed to annular surface 82, defines an exposed electrode portion embodied as channel 90.

Electrode 80 is covered in some manner by an insulative material in all areas except where the transparent conductive oxide substrate contacts the electrode (i.e., touching or within the plasma dark space limit of the electrode (e.g., about 3 mm)). This defines an exposed electrode portion that can be in intimate contact with the transparent conductive oxide substrate. The remainder of the electrode is covered by an insulative material. When the electrode is powered and the electrode becomes negatively biased with respect to the resultant plasma, this relatively thick insulative material prevents etching on the surfaces it covers. As a result, etching is limited to the uncovered area (i.e., that which is not covered with insulative material, channel 90), which preferably is covered by relatively thin transparent conductive oxide substrate.

Referring to FIGS. 1 and 2, drum 26 is rotatably affixed to back plate 22 through a ferrofluidic feedthrough and rotary union 38 (or an equivalent mechanism) affixed within a hole in back plate 22. The ferrofluidic feedthrough and rotary union provide separate fluid and electrical connection from a standard coolant fluid conduit and electrical wire to hollow coolant passages and the conductive electrode, respectively, of rotatable drum 26 during rotation while retaining a vacuum seal. The rotary union also supplies the necessary force to rotate the drum, which force is supplied from any drive means such as a brushless DC servo motor. However, connection of drum 26 to back plate 22 and the conduit and wire may be performed by any means capable of supplying such a connection and is not limited to a ferrofluidic feedthrough and a rotary union. One example of such a ferrofluidic feedthrough and rotary union is a two-inch (about 5 cm) inner diameter hollow shaft feedthrough made by Ferrofluidics Co., Nashua, N.H.

Drum 26 is rotatably driven by drive assembly 37, which can be any mechanical or electrical system capable of translating rotational motion to drum 26. In the embodiment shown in FIG. 2, drive assembly 37 includes motor 33 with a drive shaft terminating in drive pulley 31 that is mechanically connected to a driven pulley 39 rigidly connected to drum 26. Belt 35 (or equivalent structure) translates rotational motion from drive pulley 31 to driven pulley 39.

Plurality of spool mechanisms 28 are rotatably affixed to back plate 22. The plurality of spool mechanisms 28 includes a substrate spool mechanism with pair of substrate spools 28A and 28B, and, in some embodiments, also can include a spacing web spool mechanism with pair of spacing web spools 28C and 28D, and masking web spool mechanism with pair of masking web spools 28E and 28F, where each pair includes one delivery and one take-up spool. As is apparent from FIG. 2, at least each take-up spool 28B, 28D, and 28F includes a drive mechanism 27 mechanically connected thereto such as a standard motor as described below for supplying a rotational force that selectively rotates the spool as needed during etching. In addition, each delivery spool 28A, 28C, and 28E in select embodiments includes a tensioner for supplying tautness to the webs or a drive mechanism 29.

Each spool mechanism includes a delivery and a take-up spool which may be in the same or a different compartment from each other, which in turn may or may not be the same compartment the electrode is in. Each spool is of a standard construction with an axial rod and a rim radially extending from each end defining a groove in which an elongated member, in this case a substrate or web, is wrapped or wound. Each spool is securably affixed to a rotatable stem sealably extending through back plate 22. In the case of spools to be driven, the stem is mechanically connected to motor 27 (e.g., a brushless DC servo motor). In the case of non-driven spools, the spool is merely coupled in a rotatable manner through a drive mechanism 29 to back plate 22 and may include a tension mechanism to prevent slack.

RIE apparatus 10 also includes idler rollers 32 rotatably affixed within the chamber and pump 34 fluidly connected to the chamber. The idler rollers guide the substrate from substrate spool 28A to channel 90 on drum 26 and from channel 90 to take-up substrate spool 28B. In addition, where spacing webs and masking webs are used, idler rollers 32 guide these webs and the substrate from substrate spool 28A and masking web spool 28E to channel 90 and from channel 90 to take-up substrate spool 28B and take-up masking web spool 28F, respectively.

Vacuum PE apparatus 10 further includes a temperature control system for supplying temperature controlling fluid to electrode 80 via ferrofluidic feedthrough 38. The temperature control system may be provided on apparatus 10 or alternatively may be provided from a separate system and pumped to apparatus 10 via conduits so long as the temperature control fluid is in fluid connection with passages within electrode 80. The temperature control system may heat or cool electrode 80 as is needed to supply an electrode of the proper temperature for etching. In one embodiment, the temperature control system is a coolant system using a coolant (e.g., water, ethylene glycol, chloro fluorocarbons, hydrofluoroethers, and liquefied gases (e.g., liquid nitrogen)).

Vacuum plasma apparatus 10 also includes an evacuation pump fluidly connected to evacuation port(s) 70. This pump may be any vacuum pump, such as a Roots blower, a turbo molecular pump, a diffusion pump, or a cryopump, capable of evacuating the chamber. In addition, this pump may be assisted or backed up by a mechanical pump. The evacuation pump may be provided on apparatus 10 or alternatively may be provided as a separate system and fluidly connected to the chamber.

Vacuum plasma apparatus 10 also includes a fluid feeder, preferably in the form of a mass flow controller that regulates the fluid used to create the thin film, the fluid being pumped into the chamber after evacuation thereof. The feeder may be provided on apparatus 10 or alternatively may be provided as a separate system and fluidly connected to the chamber. The feeder supplies fluid in the proper volumetric rate or mass flow rate to the chamber during etching. The etching gases can include oxygen, argon, chlorine, fluorine, carbon tetrafluoride, carbontetrachloride, perfluoromethane, perfluoroethane, perfluoropropane, nitrogen trifluoride, sulfur hexafluoride, methane, and mixtures thereof.

Vacuum plasma apparatus 10 also includes a power source electrically connected to electrode 80 via electrical terminal 30. The power source may be provided on apparatus 10 or alternatively may be provided on a separate system and electrically connected to the electrode via electrical terminal (as shown in FIG. 2). In any case, the power source is any power generation or transmission system capable of supplying sufficient power. (See discussion infra.).

Although a variety of power sources are possible, RF power is preferred. This is because the frequency is high enough to form a self bias on an appropriately configured powered electrode, but not high enough to create standing waves in the resulting plasma. RF power is scalable for high output (wide webs or substrates, rapid web speed). When RF power is used, the negative bias on the electrode is a negative self bias, that is, no separate power source need be used to induce the negative bias on the electrode. Because RF power is preferred, the remainder of this discussion will focus on that type.

The RF power source powers electrode 80 with a frequency in the range of 0.01 MHz to 50 MHz, preferably 13.56 MHz or any whole number (e.g., 1, 2, or 3) multiple thereof. This RF power as supplied to electrode 80 creates a plasma from the gas within the chamber. The RF power source can be an RF generator such as a 13.56 MHz oscillator connected to the electrode via a network that acts to match the impedance of the power supply with that of the transmission line (which is usually 50 ohms resistive) so as to effectively transmit RF power through a coaxial transmission line.

Upon application of RF power to the electrode, a plasma is established. In a RF plasma, the powered electrode becomes negatively biased relative to the plasma. This bias is generally in the range of 500 volts to 1400 volts. This biasing causes ions within the plasma to accelerate toward electrode 80. Accelerating ions etch the article in contact with electrode 80 as is described in more detail below.

In operation, a full spool of substrate upon which etching is desired is inserted over the stem as spool 28A. Access to these spools is provided through lower door 18 since, in FIGS. 1 and 2, the spools are located in lower compartment 58 while etching occurs in upper compartment 56. In addition, an empty spool is fastened opposite the substrate holding spool as spool 28B so as to function as the take-up spool after etching has occurred.

If a spacer web is desired to cushion the substrate during winding or unwinding, spacer web delivery and/or take-up spool can be provided as spools 28C and 28D (although the location of the spools in the particular locations shown in the figures is not critical). Similarly, if etching is desired in a pattern or otherwise partial manner, a masking web can be positioned on an input spool as spool 28E and an empty spool is positioned as a take-up spool as spool 28F.

After all of the spools with and without substrates or webs are positioned, the substrate on which etching is to occur (and any masking web to travel therewith around the electrode) are woven or otherwise pulled through the system to the take-up spools. Spacer webs generally are not woven through the system and instead separate from the substrate just before this step and/or are provided just after this step. The substrate is specifically wrapped around electrode 80 in channel 90 thereby covering the exposed electrode portion. The substrate is sufficiently taut to remain in contact with the electrode and to move with the electrode as the electrode rotates so a length of substrate is always in contact with the electrode for etching. This allows the substrate to be etched in a continuous process from one end of a roll to the other. The substrate is in position for etching and lower door 18 is sealed closed.

Chamber 24 is evacuated to remove all air and other impurities. Once an etchant gas mixture is pumped into the evacuated chamber, the apparatus is ready to begin the process of etching. The RF power source is activated to provide an RF electric field to electrode 80. This RF electric field causes the gas to become ionized, resulting in the formation of a plasma with ions therein. This is specifically produced using a 13.56 MHz oscillator, although other RF sources and frequency ranges may be used.

Once the plasma has been created, a negative DC bias voltage is created on electrode 80 by continuing to power the electrode with RF power. This bias causes ions to accelerate toward channel (non-insulated electrode portion) 90 of electrode 80 (the remainder of the electrode is either insulated or shielded). The ions selectively etch the matrix material (versus the dispersed phase) in the length of substrate in contact with channel 90 of electrode 80 causing anisotropic etching of the matrix material of on that length of article.

For continuous etching, the take-up spools are driven so as to pull the article and any masking webs through the upper compartment 56 and over electrode 80 so that etching of the matrix occurs on any unmasked substrate portions in contact with annular channel 90. The substrate is thus pulled through the upper compartment continuously while a continuous RF field is placed on the electrode and sufficient reactive gas is present within the chamber. The result is a continuous etching on an elongated article, and substantially only on the article. Etching does not occur on the insulated portions of the electrode nor does etching occur elsewhere in the chamber. To prevent the active power fed to the plasma from being dissipated in the end plates of the cylindrical electrode, grounded dark space shields 86 and 88 can be used. Dark space shields 86 and 88 can be of any shape, size, and material that is conducive to the reduction of potential fouling. In the embodiment shown in FIGS. 1 and 2, dark space shields 86 and 88 are metal rings that fit over drum 26 and the insulation thereon. Dark space shields 86 and 88 do not bias due to the insulative material that covers drum 26 in the areas where dark space shields 86 and 88 contact drum 26. The dark space shields in this ring-like embodiment further include tabs on each end thereof extending away from drum 26 in a non-annular manner. These tabs can assist in aligning the article within channel 90.

Preferably, the temperature control system pumps fluid through electrode 80 throughout the process to keep the electrode at a desired temperature. Typically, this involves cooling the electrode with a coolant as described above, although heating in some cases may be desirable. In addition, since the substrate is in direct contact with the electrode, heat transfer from the plasma to the substrate is managed through this cooling system, thereby allowing the coating of temperature sensitive films such as polyethyleneterephthalate, and polyethylene naphthalate.

After completion of the etching process, the spools can be removed from shafts supporting them on the wall. The substrate with the sub-micrometer structured article thereon is on spool 28B and is ready for use.

Some embodiments of materials described herein can also be made by methods described in U.S. Pat. Appl. No. 61/593,666, filed Feb. 1, 2012, the disclosure of which is incorporated herein by reference.

In another aspect, materials described herein have a reflection less than 2 percent (in some embodiments, less than 1.5 percent or even less than 0.5 percent) as measured by Procedure 3 in the Examples below. The materials described herein can have a haze less than 3 percent (in some embodiments, less than 2 percent, 1.5 percent, or even less than 1 percent) as measured by Procedure 3 in the Examples below.

In some embodiments, sub-micrometer structured articles described herein comprise additional layers. For example, the article may comprise an additional fluorochemical layer to give the article improved water and/or oil repellency properties. The sub-micrometer structured surface may also be post treated (e.g., with an additional plasma treatment). Plasma post treatments may include surface modification to change the chemical functional groups that might be present on the sub-micrometer structure or for the deposition of thin films that enhance the performance of the sub-micrometer structure. Surface modification can include the attachment of methyl, fluoride, hydroxyl, carbonyl, carboxyl, silanol, amine, or other functional groups. The deposited thin films can include fluorocarbons, glass-like, diamond-like, oxide, carbide, and nitride. When the surface modification treatment is applied, the density of the surface functional groups is high due to the large surface area of the etched sub-micrometer structured surface. When amine functionality is used, biological agents (e.g., antibodies, proteins, and enzymes) can be easily grafted to the amine functional groups. When silanol functionality is used, silane chemistries can be easily applied to the sub-micrometer structured surface due to the high density of silanol groups. Antimicrobial, easy-clean, and anti-fouling surface treatments that are based on silane chemistry are commercially available. Antimicrobial treatments may include quaternary ammonium compounds with silane end group. Easy-clean compounds may include fluorocarbon treatments, such as perfluoropolyether silane, and hexafluoropropyleneoxide (HFPO) silane. Anti-fouling treatments may include polyethyleneglycol silane. When thin films are used, these thin films may provide additional durability to the sub-micrometer structure or provide unique optical effects depending upon the refractive index of the thin film. Specific types of thin films may include diamond-like carbon (DLC), diamond-like glass (DLG), amorphous silicon, silicon nitride, plasma polymerized silicone oil, aluminum, and copper.

For articles comprising, in order, a substrate, functional layer, and a layer of material described herein, the article can be made, for example, by a method comprising:
  providing a substrate having first and second generally opposed major surfaces and the functional layer having opposing first and second major surfaces, wherein the first major surface of the functional layer is disposed on the first major surface of the substrate;
  providing a layer comprising sub-micrometer particles dispersed in a polymeric matrix;
  drying and/or curing the layer; and
  etching the cured layer to provide the random sub-micrometer structured surface.

For composites further comprising in order relative to the substrate, a second functional layer, and a second sub-micrometer structured surface, the preceding method can be conducted, for example, by providing the substrate with the functional layer (which may be the same or different) on each major surface of the substrate, and applying the second sub-micrometer structured surface on the functional layer. In some embodiments, the second sub-micrometer structured surface is applied simultaneously with the first sub-micrometer structured surface. In some embodiments, the second functional layer is provided after the first sub-micrometer structured surface is applied, while in others, for example, during the application of the first sub-micrometer structured surface.

For composites described herein comprising, in order, a substrate, a sub-micrometer structured surface, and a functional layer, the composite can be made, for example, by a method comprising:
  providing a substrate having first and second generally opposed major surfaces;
  coating a coatable composition comprising a matrix material and a sub-micrometer scale dispersed phase in the first matrix material on the first major surface of the substrate;
  optionally drying the coating (and optionally curing the dried coating) to provide an article comprising a matrix and a sub-micrometer scale dispersed phase in the matrix;
  exposing a major surface of the article to etching, wherein the etching comprises:
    placing the article on a cylindrical electrode in a vacuum vessel;
    introducing etchant gas to the vacuum vessel at a predetermined pressure (e.g., in a range from 5 milliTorr to 1000 milliTorr);
    generating plasma (e.g., an oxygen plasma) between the cylindrical electrode and a counter-electrode;
    rotating the cylindrical electrode to translate the substrate; and
    etching the coating to provide the first sub-micrometer structured surface; and
  disposing a functional layer on the sub-micrometer structured surface.

For composites further comprising in order relative to the substrate, a second sub-micrometer structured surface, and a second functional layer, the preceding method can be conducted, for example, by applying the second sub-micrometer structured surface on the functional layer, and then disposing a functional layer (which may be the same or different) on a major surface of the second sub-micrometer structured surface. In some embodiments, the second sub-micrometer structured surface is applied simultaneously with the first sub-micrometer structured surface. In some embodiments, the second functional layer is provided after the first sub-micrometer structured surface is applied, while in others, for example, during the application of the first sub-micrometer structured surface.

Additional etching methods include the use of energized gas containing an ion, an electron, and/or an excited gas, formed from oxygen, air, nitrogen, argon, or freon by using a corona discharge means or a direct current, low frequency or micro-wave high voltage discharge means under atmospheric pressure environment.

There are several deposition techniques used to form the transparent conductive films, including chemical vapor deposition (CVD), magnetron sputtering, evaporation, and spray pyrolysis. Glass substrates have been widely used for making organic light emitting diodes. Glass substrates, however, tend to be undesirable for certain applications (e.g., electronic maps and portable computers). Where flexibility is desired, glass is brittle and hence undesirable. Also, for some applications (e.g., large area displays) glass is too heavy. Plastic substrates are an alternative to glass substrates. The growth of transparent conductive films on plastic substrates by low temperature (25° C.-125° C.) sputtering is reported, for example, by Gilbert et al., $47^{th}$ Annual Society of Vacuum Coaters Technical Conference Proceedings (1993), T. Minami et al., Thin Solid Film, Vol. 270, page 37 (1995), and J. Ma, Thin Solid Films, vol. 307, page 200 (1997). Another deposition technique, pulsed laser deposition, is reported, for example, in U.S. Pat. No. 6,645,843 (Kim et al.), wherein a smooth, low electrical resistivity indium-tin-oxide (ITO) coating is formed on a polyethylene terephthalate (PET) substrate. The electrically-conductive layer can include a conductive elemental metal, a conductive metal alloy, a conductive metal oxide, a conductive metal nitride, a conductive metal carbide, a conductive metal boride, and combinations thereof. Preferred conductive metals include elemental silver, copper, aluminum, gold, palladium, platinum, nickel, rhodium, ruthenium, aluminum, and zinc. Alloys of these metals, such as silver-gold, silver-palladium, silver-gold-palladium, or dispersions containing these metals in admixture with one another or with other metals also can be used. Transparent conductive oxides (TCO), such as indium-tin-oxide (ITO), indium-zinc-oxide (IZO), zinc oxide, with or without, dopants, such as aluminum, gallium and boron, other TCOs, and combinations thereof can also be used as an electrically-conductive layer. Preferably, the physical thickness of an electrically-conductive metallic layer is in a range from about 3 nm to about 50 nm (in some embodiments, about 5 nm to about 20 nm), whereas the physical thickness of the transparent conductive oxide layers are preferably in a range from about 10 nm to about 500 nm (in some embodiments, about 20 nm to about 300 nm). The resulting electrically-conductive layer can typically provide a sheet resistance of less than 300 ohms/sq. (in some embodiments, less than 200 ohms/sq., or even less than 100 ohms/sq.). For functional layers applied to a structured surface, the layer may follow the surface contour of the structured surface so that the antireflection function is created at the interface between the structured surface and the deposited layer, and at the second surface of the functional coating layer contacting air or the surface of another substrate.

Transparent conductive films can be made, for example, from transparent conductive polymers. Conductive polymers include derivatives of polyacetylene, polyaniline, polypyrrole, PETOT/PSS (poly(3,4-ethylenedioxythiophene)/polystyrenesulfonic acid), or polythiophenes (see, e.g., Skotheim et al., Handbook of Conducting Polymers, 1998). Although not wanting to be bound by theory, it is believed that these polymers have conjugated double bonds which allow for conduction. Further, although not wanting to be bound by theory, it is believed that by manipulating the band structure, polythiophenes have been modified to achieve a HUMO-LUMO separation that is transparent to visible light. In a polymer, the band structure is determined by the molecular orbitals. The effective bandgap is the separation between the highest occupied molecular orbital (HOMO) and lowest unoccupied molecular orbital (LUMO).

The transparent conductive layer can comprise, for example, anisotropic nano-scale materials which can be solid or hollow. Solid anisotropic nano-scale materials include nanofibers and nanoplatelets. Hollow anisotropic nano-scale materials include nanotubes. Typically, the nanotube has an aspect ratio (length:diameter) greater than 10:1 (in some embodiments, greater than 50:1, or even greater than 100:1). The nanotubes are typically greater than 500 nm (in some embodiments, greater than 1 micrometer, or even greater than 10 micrometers) in length. These anisotropic nano-scale materials can be made from any conductive material. Most typically, the conductive material is metallic. The metallic material can be an elemental metal (e.g., transition metals) or a metal compound (e.g., metal oxide). The metallic material can also be a metal alloy or a bimetallic material, which comprises two or more types of metal. Suitable metals include silver, gold, copper, nickel, gold-plated silver, platinum, and palladium. The conductive material can also be non-metallic (e.g., carbon or graphite (an allotrope of carbon)).

Gas (e.g., water vapor and oxygen) barrier films typically comprise a relatively thin (e.g., about 100 nm to about 300 nm) layer of a metal oxide, such as aluminum oxide, magnesium oxide, or silicon oxide on a film surface. Other exemplary layers on films to provide a gas barrier film include ceramics, such as silicon oxide, silicon nitride, aluminum oxide nitride, magnesium oxide, zinc oxide, indium oxide, tin oxide, tin-doped indium oxide, and aluminum-doped zinc oxide. Gas barrier films can be a single barrier layer or multiple barrier layers construction. The barrier layer may also comprise multifunctional properties such as conductive functionality.

In some embodiments, the surface of the matrix comprising the sub-micrometer particles may be microstructured. For example, a transparent conductive oxide-coated substrate, with a v-groove microstructured surface can be coated with polymerizable matrix materials comprising the sub-micrometer particles and treated by plasma etching to form nanostructures on v-groove microstructured surface. Other examples include a fine micro-structured surface resulting from controlling the solvent evaporation process from multi-solvent coating solutions, reported as in U.S. Pat. No. 7,378,136 (Pokorny et al.); or the structured surface from the micro-replication method reported in U.S. Pat. No. 7,604,381 (Hebrink et al.); or any other structured surface induced, for example, by electrical and magnetic fields.

Optionally, articles described herein further comprise an optically clear adhesive disposed on the second surface of the substrate. The optically clear adhesives that may be used in the present disclosure preferably are those that exhibit an optical transmission of at least about 90%, or even higher, and a haze value of below about 5% or even lower, as measured on a 25 micrometer thick sample in the matter described below in the Example section under the Haze and Transmission Tests for optically clear adhesive. Suitable optically clear adhesives may have antistatic properties, may be compatible with corrosion sensitive layers, and may be able to be released from the substrate by stretching the adhesive. Illustrative optically clear adhesives include those described in PCT Pub. No. WO 2008/128073 (Everaerts et al.) relating to antistatic optically clear pressure sensitive adhesive; U.S. Pat. Appl. Pub. No. US 2009/0229732A1 (Determan et al.) relating to stretch releasing optically clear adhesive; U.S. Pat. Appl. Pub. No. US 2009/0087629 (Everaerts et al.) relating to indium tin oxide compatible optically clear adhesive; U.S. Pat. Appl. Pub. No. US 2010/0028564 (Everaerts et al.) relating to antistatic optical constructions having optically transmissive adhesive; U.S. Pat. Appl. Pub. No. 2010/0040842 (Everaerts et al.) relating to adhesives compatible with corrosion sensitive layers; PCT Pub. No. WO 2009/114683 (Determan et al.) relating to optically clear stretch release adhesive tape; and PCT Pub. No. WO 2010/078346 (Yamanaka et al.) relating to stretch release adhesive tape. In one embodiment, the optically clear adhesive has a thickness of up to about 5 micrometer.

In some embodiments, articles described herein further comprise a hardcoat comprising at least one of $SiO_2$ nanoparticles or $ZrO_2$ nanoparticles dispersed in a crosslinkable matrix comprising at least one of multi(meth)acrylate, polyester, epoxy, fluoropolymer, urethane, or siloxane (which includes blends or copolymers thereof). Commercially available liquid-resin based materials (typically referred to as "hardcoats") may be used as the matrix or as a component of the matrix. Such materials include that available from California Hardcoating Co., San Diego, Calif., under the trade designation "PERMANEW"; and from Momentive Performance Materials, Albany, N.Y., under the trade designation "UVHC". Additionally, commercially available nanoparticle filled matrix may be used such as those available from Nanoresins AG, Geesthacht Germany, under the trade designations "NANOCRYL" and "NANOPDX".

Figure 5:
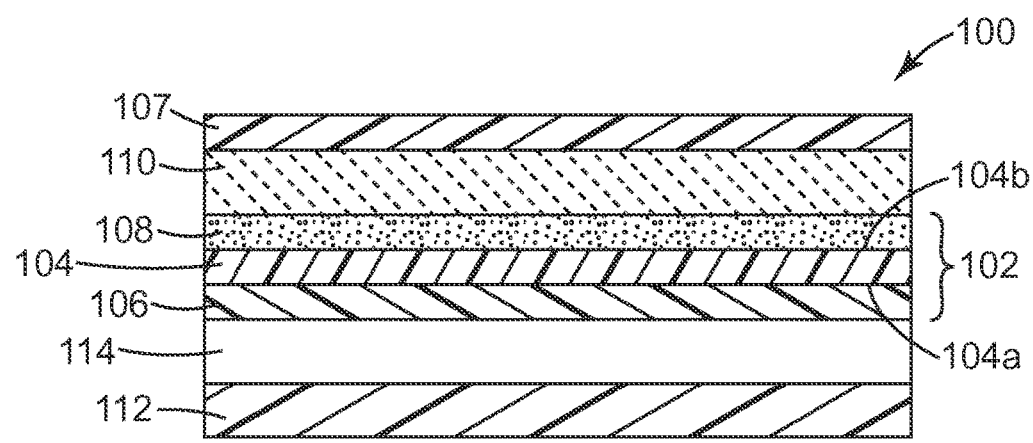
FIG. 5 is a schematic cross-sectional view of a display using an exemplary sub-micrometer structured antireflective article described herein.

FIG. 5 shows a schematic cross sectional view of an exemplary display 100 (e.g., a liquid crystal display (LCD)) using an (sub-micrometer structured antireflective) article as disclosed herein. In one embodiment, composite 102 includes transparent substrate, transparent conductive oxide-coated substrate or polarizer 104 having opposing first and second surfaces 104a and 104b with sub-micron structured antireflective layer 106 disposed on first surface 104a and optically clear adhesive 108 disposed on second surface 104b. Optionally a release liner (not shown) can be used to protect the optically clear adhesive and a premask (also not shown) can be used to protect the antireflective coating during processing and storage. Composite 102 is then laminated to a transparent substrate 110 with sub-micrometer structured antireflective layer 107 deposited on the first surface of the substrate 110 such that optically clear adhesive 108 is in direct contact with the second surface of the substrate 110 which is then assembled to liquid crystal module 112, typically, with air gap 114 disposed between antireflective coating 106 and liquid crystal module 112.

In some embodiments, the articles described herein further comprises a surface protection adhesive sheet (laminate premasking film) having a releasable adhesive layer formed on the entire area of one side surface of a film, such as a polyethylene film, a polypropylene film, a vinyl chloride film, or a polyethylene terephthalate film to the surface of the articles, or by superimposing the above-mentioned polyethylene film, a polypropylene film, a vinyl chloride film, or a polyethylene terephthalate film on the surface of articles.

EXEMPLARY EMBODIMENTS

1A. A material comprising sub-micrometer particles dispersed in a polymeric matrix, wherein the material has a major surface, wherein the sub-micrometer particles have particle sizes of at least 75 nm (in some embodiments, in a range from 75 nm to 500 nm (in some embodiments, 100 nm to 300 nm, or even 150 nm to 250 nm)), wherein a portion of the sub-micrometer particles protrude from the major surface by up to 90 (in some embodiments, 80, 70, 60, or even up to 50) percent of their respective particle sizes, wherein the protruding sub-micrometer particles each have an exposed outer surface, wherein less than 50 (in some embodiments, less than 40, 30, 25, 20, 15, 10, 5, or 1; or zero) percent of the exposed outer surface is covered by organic material.

2A. The material of embodiment 1A, wherein the sub-micrometer particles are covalently bonded to the polymeric matrix.

3A. The material of either embodiment 1A or 2A, wherein at least a portion of the polymeric matrix comprises at least one of tetrafluoroethylene, vinylfluoride, vinylidene fluoride, chlorotrifluoroethylene, perfluoroakoxy, fluorinated ethylene-propylene, ethylenetetrafluoroethylene, ethylenechlorotrifluoroethylene, perfluoropolyether, perfluoropolyoxetane, hexafluoropropylene oxide, siloxane, organosilicon, siloxides, silyl halides, ethylene oxide, propylene oxide, hydroxyl, hydroxylamine, carboxylic acid, —COONa, —SO3Na, —HCONCH3, —CONEt2, acrylamide, amine, ether, sulfonate, acrylic acid, maleic anhydride, vinyl acid, vinyl alcohol, vinylpyridine, vinypyrrolidone, acetylene, pyrrole, thiophene, aniline, phenylene sulfide, or imidazole.

4A. The material of any preceding embodiment, wherein at least some of the sub-micrometer particles are functionalized with at least one multifunctional silane coupling agent comprising silanol and at least one of acrylate, epoxy, or vinyl functional groups.

5A. The material of any preceding embodiment, wherein the sub-micrometer particles are present in a range from 10 percent to 70 percent (in some embodiments, 30 percent to 60 percent, or even 35 percent to 55 percent) by volume, based on the total volume of the material.

6A. The material of any preceding embodiment, wherein the sub-micrometer particles comprise at least one of carbon, metal, metal oxide, metal carbide, metal nitride, or diamond.

7A. The material of any preceding embodiment, wherein the sub-micrometer particles have particle sizes in a range from 75 nm to 500 nm.

8A. The material of any preceding embodiment, wherein the sub-micrometer particles have a bimodal distribution.

9A. The material of any preceding embodiment, wherein the portion of the sub-micrometer particles protruding from the major surface protrudes by up to 50 percent of their respective particle sizes.

10A. The material of any preceding embodiment, wherein the portion of the sub-micrometer particles protruding from the major surface protrudes in a range from 60 nm to 300 nm (in some embodiments, 75 nm to 250 nm, or even 75 nm to 150 nm).

11A. The material of any preceding embodiment, wherein there is an average spacing between the protruding sub-micrometer particles is from 5 nm to 300 nm (in some embodiments, 10 nm to 300 nm, 20 nm to 300 nm, 30 nm to 300 nm, 40 nm to 300 nm, 50 nm to 275 nm, 75 nm to 250 nm, or even 100 nm to 225 nm).

12A. The material of any preceding embodiment, wherein the polymeric matrix (e.g., cross linkable material) comprises at least one of acrylate, urethane acrylate, methacrylate, polyester, epoxy, fluoropolymer, or siloxane.

13A. The material of any preceding embodiment A having a change in reflection from the Durability Test of less than 2 (in some embodiments, less than 1, 0.75, 0.5, or even less than 0.25; or even zero) percent.

14A. The material of any preceding embodiment that is a layer.

15A. The layer of embodiment 13A having a thickness of at least 500 nm (in some embodiments, at least 1 micrometer, 1.5 micrometer, 2 micrometer, 2.5 micrometers, 3 micrometers, 4 micrometers, 5 micrometers, 7.5 micrometers, or even at least 10 micrometers).

16A. An article comprising a substrate having first and second generally opposed major surfaces with the layer of either embodiment 13A or 14A on the first major surface.

17A. The article of embodiment 15A, wherein the substrate is a polarizer (e.g., reflective polarizer or absorptive polarizer).

18A. The article of either embodiment 15A or 16A, wherein the first major surface of the substrate has a microstructured surface.

19A. The article of either embodiment 15A or 16A, wherein the first major surface of the substrate has a sub-micrometer structured surface (e.g., comprises a matrix and a sub-micrometer scale dispersed phase, and having a sub-micrometer structured surface).

20A. The article of any of embodiments 15A to 18A further comprising a hardcoat comprising at least one of $SiO_2$ nanoparticles or $ZrO_2$ nanoparticles dispersed in a crosslinkable matrix comprising at least one of multi(meth)acrylate, polyester, epoxy, fluoropolymer, urethane, or siloxane.

21A. The article of any of embodiments 15A to 19A having a reflection less than 2 percent (in some embodiments, less than 1.5 percent or even less than 0.5 percent).

22A. The article of any of embodiments 15A to 20A having a haze less than 3 percent (in some embodiments, less than 2 percent, 1.5 percent, or even less than 1 percent).

23A. The article of any of embodiments 15A to 21A having a visible light transmission of at least 90 percent (in some embodiments, at least 94 percent, 95 percent, 96 percent, 97 percent, 98 percent, 99 percent, or even 100 percent).

24A. The article of any of embodiments 15A to 22A, further comprising a functional layer disposed between the first major surface of the substrate and the layer, wherein the functional layer is at least one of a transparent conductive layer or a gas barrier layer.

25A. The article of any of embodiments 15A to 23A, further comprising a pre-mask film disposed on the layer.

26A. The article of any of embodiments 15A to 22A, further comprising a functional layer disposed on the layer, wherein this functional layer is at least one of a transparent conductive layer or a gas barrier layer.

27A. The article of any of embodiments 15A to 23A or 25A further comprising a functional layer disposed on the second major surface of the substrate, wherein this functional layer is at least one of a transparent conductive layer or a gas barrier layer.

28A. The article of embodiment 26A further comprising a second layer on the functional layer disposed on the second major surface of the substrate, the second layer comprising sub-micrometer particles dispersed in a polymeric matrix, wherein the material has a major surface, wherein the sub-micrometer particles have particle sizes of at least 75 nm (in some embodiments, in a range from 75 nm to 500 nm (in some embodiments, 100 nm 300 nm, or even 150 nm to 250 nm)), wherein a portion of the sub-micrometer particles protrude from the major surface by up to 90 (in some embodiments, 80, 70, 60, or even up to 50) percent of their respective particle sizes, wherein the protruding sub-micrometer particles each have an exposed outer surface wherein less than 50 (in some embodiments, less than 60, 70, 75, 80 85, 90, 95, 99, or even 100) percent of the exposed outer surface is covered by organic material.

29A. The article of any of embodiments 15A to 23A or 25A further comprising a second layer on the second major surface of the substrate, the second layer comprising sub-micrometer particles dispersed in a polymeric matrix, wherein the material has a major surface, wherein the sub-micrometer particles have particle sizes of at least 75 nm (in some embodiments, in a range from 75 nm to 500 nm (in some embodiments, 100 nm 300 nm, or even 150 nm to 250 nm)), wherein a portion of the sub-micrometer particles protrude from the major surface by up to 90 (in some embodiments, 80, 70, 60, or even up to 50) percent of their respective particle sizes, and wherein the protruding sub-micrometer particles each have an exposed outer surface wherein less than 50 (in some embodiments, less than 60, 70, 75, 80 85, 90, 95, 99, or even 100) percent of the exposed outer surface is covered by organic material.

30A. The article of embodiment 28A further comprising a functional layer disposed on second layer the second major surface of the substrate, wherein this functional layer is at least one of a transparent conductive layer or a gas barrier layer.

31A. The article of any of embodiments 15A to 23A or 25A, further comprising an optically clear adhesive disposed on the second surface of the substrate, the optically clear adhesive having at least 90% transmission in visible light and less than 5% haze.

32A. The article of embodiment 30A further comprising a major surface of a glass substrate attached to the optically clear adhesive.

33A. The article of any of embodiment 30A, further comprising a major surface of a polarizer substrate attached to the optically clear adhesive.

34A. The article of embodiment 30A further comprising a major surface of a touch sensor attached to the optically clear adhesive.

35A. The article of embodiment 30A, further comprising a release liner disposed on the second major surface of the optically clear adhesive.

36A. A method of making an article, the method comprising:
   providing a layer comprising sub-micrometer particles dispersed in a polymeric precursor matrix;
   at least one of drying or curing the layer; and
   etching the at least one dried or cured layer, as applicable, to provide the article of any of embodiments 15A to 22A.

37A. The method of embodiment 35A, wherein the layer is on a substrate is at an elevated temperature relative to ambient during the etching.

38A. The method of either embodiment 35A or 36A, wherein the etching is at least one of reactive ion etching, vacuum plasma etching, atmospheric pressure plasma etching, atmospheric pressure corona etching, acid etching, or flame treatment.

39A. The method of any of embodiments 35A to 37A, wherein s providing a layer includes at least one of solvent casting or extrusion casting.

40A. The method of any of embodiments 35A to 38A, wherein the curing is at least one of ultraviolet curing or thermally curing.

1B. A material comprising sub-micrometer particles dispersed in a polymeric matrix, wherein the material has a major surface, wherein the sub-micrometer particles have particle sizes of at least 75 nm (in some embodiments, in a range from 75 nm to 500 nm (in some embodiments, 100 nm to 300 nm, or even 150 nm to 250 nm)), wherein a portion of the sub-micrometer particles protrude from the major surface in a range from 50 nm to 200 nm (in some embodiments, 75 nm to 175 nm, or even 100 nm to 150 nm), and wherein a portion of the sub-micrometer particles protrude from the major surface by up to 90 (in some embodiments, 80, 70, 60, or even up to 50) percent of their respective particle sizes.

2B. The material of embodiment 1B, wherein the protruding sub-micrometer particles each have an exposed outer surface, and wherein less than 50 (in some embodiments, less than 40, 30, 25, 20, 15, 10, 5, or 1; or zero) percent of the exposed outer surface is covered by organic material.

3B. The material of either embodiment 1B or 2B, wherein the sub-micrometer particles are covalently bonded to the polymeric matrix.

4B. The material of any preceding embodiment B, wherein at least a portion of the polymeric matrix comprises at least one of tetrafluoroethylene, vinylfluoride, vinylidene fluoride, chlorotrifluoroethylene, perfluoroakoxy, fluorinated ethylene-propylene, ethylenetetrafluoroethylene, ethylenechlorotrifluoroethylene, perfluoropolyether, perfluoropolyoxetane, hexafluoropropylene oxide, siloxane, organosilicon, siloxides, silyl halides, ethylene oxide, propylene oxide, hydroxyl, hydroxylamine, carboxylic acid, —COONa, —SO3Na, —HCONCH3, —CONEt2, acrylamide, amine, ether, sulfonate, acrylic acid, maleic anhydride, vinyl acid, vinyl alcohol, vinylpyridine, vinypyrrolidone, acetylene, pyrrole, thiophene, aniline, phenylene sulfide, or imidazole.

5B. The material of any preceding embodiment B, wherein at least some of the sub-micrometer particles are functionalized with at least one multifunctional silane coupling agent comprising silanol and at least one of acrylate, epoxy, or vinyl functional groups.

6B. The material of any preceding embodiment B, wherein the sub-micrometer particles are present in a range from 10 percent to 70 percent (in some embodiments, 30 percent to 60 percent, or even 35 percent to 55 percent) by volume, based on the total volume of the material.

7B. The material of any preceding embodiment B, wherein the sub-micrometer particles comprise at least one of carbon, metal, metal oxide, metal carbide, metal nitride, or diamond.

8B. The material any preceding embodiment B, wherein the sub-micrometer particles have particle sizes in a range from 75 nm to 500 nm.

9B. The material of any preceding embodiment B, wherein the sub-micrometer particles have a bimodal distribution.

10B. The material of any preceding embodiment B, wherein the portion of the sub-micrometer particles protruding from the major surface protrudes by up to 50 percent of their respective particle sizes.

11B. The material of any preceding embodiment B, wherein the portion of the sub-micrometer particles protruding from the major surface protrudes in a range from 60 nm to 300 nm (in some embodiments, 75 nm to 250 nm, or even 75 nm to 150 nm).

12B. The material of any preceding embodiment B, wherein there is an average spacing between the protruding sub-micrometer particles is in a range from 5 nm to 300 nm (in some embodiments, 10 nm to 300 nm, 20 nm to 300 nm, 30 nm to 300 nm, 40 nm to 300 nm, 50 nm to 275 nm, 75 nm to 250 nm, or even 100 nm to 225 nm).

13B. The material of any preceding embodiment B, wherein the polymeric matrix (e.g., cross linkable material) comprises at least one of acrylate, urethane acrylate, methacrylate, polyester, epoxy, fluoropolymer, or siloxane.

14B. The material of any preceding embodiment B, wherein the sub-micrometer particles are covalently bonded to the polymeric matrix.

15B. The material of any preceding embodiment B that is a layer.

16B. The layer of embodiment 15B having a thickness of at least 500 nm (in some embodiments, at least 1 micrometer, 1.5 micrometer, 2 micrometer, 2.5 micrometers, 3 micrometers, 4 micrometers, 5 micrometers, 7.5 micrometers, or even at least 10 micrometers).

17B. An article comprising a substrate having first and second generally opposed major surfaces with the layer of either embodiment 15B or 16B on the first major surface.

18B. The article of embodiment 17B, wherein the substrate is a polarizer (e.g., reflective polarizer or absorptive polarizer).

19B. The article of either embodiment 17B or 18B, wherein the first major surface of the substrate has a microstructured surface.

20B. The article of either embodiment 17B or 18B, wherein the first major surface of the substrate has a sub-micrometer structured surface (e.g., comprises a matrix and a sub-micrometer scale dispersed phase, and having a sub-micrometer structured surface).

21B. The article of any of embodiments 17B to 20B further comprising a hardcoat comprising at least one of $SiO_2$ nanoparticles or $ZrO_2$ nanoparticles dispersed in a crosslinkable matrix comprising at least one of multi(meth) acrylate, polyester, epoxy, fluoropolymer, urethane, or siloxane.

22B. The article of any of embodiments 17B to 21B having a reflection less than 2 percent (in some embodiments, less than 1.5 percent or even less than 0.5 percent).

23B. The article of any of embodiments 17B to 22B having a haze less than 3 percent (in some embodiments, less than 2 percent, 1.5 percent, or even less than 1 percent).

24B. The article of any of embodiments 17B to 23B having a visible light transmission of at least 90 percent (in some embodiments, at least 94 percent, 95 percent, 96 percent, 97 percent, 98 percent, 99 percent, or even 100 percent).

25B. The article of any of embodiments 17B to 24B, further comprising a functional layer disposed between the first major surface of the substrate and the layer, wherein the functional layer is at least one of a transparent conductive layer or a gas barrier layer.

26B. The article of any of embodiments 17B to 25B, further comprising a functional layer disposed on the layer, wherein this functional layer is at least one of a transparent conductive layer or a gas barrier layer.

27B. The article of any of embodiments 17B to 26B, further comprising a pre-mask film disposed on the layer.

28B. The article of any of embodiments 17B to 27B further comprising a functional layer disposed on the second major surface of the substrate, wherein this functional layer is at least one of a transparent conductive layer or a gas barrier layer.

29B. The article of embodiment 28B further comprising a second layer on the functional layer disposed on the second major surface of the substrate, the second layer comprising sub-micrometer particles dispersed in a polymeric matrix, wherein the material has a major surface, wherein the sub-micrometer particles have particle sizes of at least 75 nm (in some embodiments, in a range from 75 nm to 500 nm (in some embodiments, 100 nm 300 nm, or even 150 nm to 250 nm)), wherein a portion of the sub-micrometer particles protrude from the major surface by up to 90 (in some embodiments, 80, 70, 60, or even up to 50) percent of their respective particle sizes, wherein the protruding sub-micrometer particles each have an exposed outer surface, and wherein less than 50 (in some embodiments, less than 60, 70, 75, 80 85, 90, 95, 99, or even 100) percent of the exposed outer surface is covered by organic material.

30B. The article of any of embodiments 17B to 28B further comprising a second layer on the second major surface of the substrate, the second layer comprising sub-micrometer particles dispersed in a polymeric matrix, wherein the material has a major surface, wherein the sub-micrometer particles have particle sizes of at least 75 nm (in some embodiments, in a range from 75 nm to 500 nm (in some embodiments, 100 nm 300 nm, or even 150 nm to 250 nm)), wherein a portion of the sub-micrometer particles protrude from the major surface in a range from 50 nm to 200 nm (in some embodiments, 75 nm to 175 nm, or even 100 nm to 150 nm), and wherein a portion of the sub-micrometer particles protrude from the major surface by up to 90 (in some embodiments, 80, 70, 60, or even up to 50) percent of their respective particle sizes.

31B. The article of embodiment 30B further comprising a functional layer disposed on second layer the second major surface of the substrate, wherein this functional layer is at least one of a transparent conductive layer or a gas barrier layer.

32B. The article of any of embodiments 17B to 28B further comprising a second layer on the second major surface of the substrate, the second layer comprising sub-micrometer particles dispersed in a polymeric matrix, wherein the material has a major surface, wherein the sub-micrometer particles have particle sizes of at least 75 nm (in some embodiments, in a range from 75 nm to 500 nm (in some embodiments, 100 nm 300 nm, or even 150 nm to 250 nm)), wherein a portion of the sub-micrometer particles protrude from the major surface by up to 90 (in some embodiments, 80, 70, 60, or even up to 50) percent of their respective particle sizes, wherein the protruding sub-micrometer particles each have an exposed outer surface, wherein less than 50 (in some embodiments, less than 60, 70, 75, 80 85, 90, 95, 99, or even 100) percent of the exposed outer surface is covered by organic material.

33B. The article of embodiment 32B further comprising a functional layer disposed on second layer the second major surface of the substrate, wherein this functional layer is at least one of a transparent conductive layer or a gas barrier layer.

34B. The article of any of embodiments 17B to 28B, further comprising an optically clear adhesive disposed on the second surface of the substrate, the optically clear adhesive having at least 90% transmission in visible light and less than 5% haze.

35B. The article of embodiment 34B further comprising a major surface of a glass substrate attached to the optically clear adhesive.

36B. The article of any of embodiment 34B, further comprising a major surface of a polarizer substrate attached to the optically clear adhesive.

37B. The article of embodiment 34B further comprising a major surface of a touch sensor attached to the optically clear adhesive.

38B. The article of embodiment 34B, further comprising a release liner disposed on the second major surface of the optically clear adhesive.

39B. A method of making an article, the method comprising:
providing a layer comprising sub-micrometer particles dispersed in a polymeric precursor matrix;
at least one of drying or curing the layer; and
etching the dried or cured layer, as applicable, to provide the material article of any of embodiments 17B to 28B.

40B. The method of embodiment 39B, wherein the layer is on a substrate is at an elevated temperature relative to ambient during the etching.

41B. The method of either embodiment 39B or 40B, wherein the etching is at least one of reactive ion etching, vacuum plasma etching, atmospheric pressure plasma etching, atmospheric pressure corona etching, acid etching, or flame treatment.

42B. The method of any of embodiments 39B to 41B, wherein the providing a layer includes at least one of solvent casting or extrusion casting.

43B. The method of any of embodiments 39B to 42B, wherein the curing is at least one of ultraviolet curing or thermally curing.

1C. A material comprising sub-micrometer particles dispersed in a polymeric matrix, wherein the material has a major surface, wherein a portion of the sub-micrometer particles protrude from the major surface by up to 90 (in some embodiments, 80, 70, 60, or even up to 50) percent of their respective particle sizes, and wherein the sub-micrometer particles are covalently bonded to the polymeric matrix.

2C. The material of embodiment 1C, wherein at least a portion of the polymeric matrix comprises at least one of tetrafluoroethylene, vinylfluoride, vinylidene fluoride, chlorotrifluoroethylene, perfluoroakoxy, fluorinated ethylenepropylene, ethylenetetrafluoro ethylene, ethylenechlorotrifluoroethylene, perfluoropolyether, perfluoropolyoxetane, hexafluoropropylene oxide, siloxane, organosilicon, siloxides, silyl halides, ethylene oxide, propylene oxide, hydroxyl, hydroxylamine, carboxylic acid, —COONa, —SO3Na, —CONHCH3, —CON(CH2CH3)$_2$, acrylamide, amine, ether, sulfonate, acrylic acid, maleic anhydride, vinyl acid, vinyl alcohol, vinylpyridine, vinypyrrolidone, acetylene, pyrrole, thiophene, aniline, phenylene sulfide, or imidazole.

3C. The material of either embodiment 1C or 2C, wherein at least some of the sub-micrometer particles are functionalized with at least one multifunctional silane coupling agent comprising at least one of silanol, acrylate, epoxy, or vinyl functional groups.

4C. The material of any preceding embodiment C, wherein the sub-micrometer particles have particle sizes of at least 20 nm (in some embodiments, in a range from 20 nm to 500 nm (in some embodiments, 75 nm to 500 nm, 100 nm 300 nm, or even 150 nm to 250 nm)).

5C. The material of any preceding embodiment C, wherein the sub-micrometer particles are present in a range from 10 percent to 70 percent (in some embodiments, 30 percent to 60 percent, or even 35 percent to 55 percent) by volume, based on the total volume of the material.

6C. The material of any preceding embodiment C, wherein the sub-micrometer particles comprise at least one of carbon, metal, metal oxide, metal carbide, metal nitride, or diamond.

7C. The material of any preceding embodiment C, wherein the sub-micrometer particles have particle sizes in a range from 5 nm to 10 micrometer (in some embodiments, from 25 nm to 5 micrometer, from 50 nm to 1 micrometer, or even if from 75 nm to 500 nm).

8C. The material of any preceding embodiment C, wherein the sub-micrometer particles have a bimodal distribution.

9C. The material of any preceding embodiment C, wherein the material comprises particles in a range from 1 micrometer to 10 micrometer in size protruding from the major surface protrudes by up to 50 percent of their respective particle sizes.

10C. The material of any preceding embodiment C, wherein the portion of the sub-micrometer particles protruding from the major surface protrudes in a range from 60 nm to 300 nm (in some embodiments, 75 nm to 250 nm, or even 75 nm to 150 nm).

11C. The material of any preceding embodiment C, wherein there is an average spacing between the protruding sub-micrometer particles in a range from 5 nm to 300 nm (in some embodiments, 10 nm to 300 nm, 20 nm to 300 nm, 30 nm to 300 nm, 40 nm to 300 nm, 50 nm to 275 nm, 75 nm to 250 nm, or even 100 nm to 225 nm).

12C. The material of any preceding embodiment C, wherein the polymeric matrix (e.g., cross linkable material) comprises at least one of acrylate, urethane acrylate, methacrylate, polyester, epoxy, fluoropolymer, or siloxane.

13C. The material of any preceding embodiment C that is a layer.

14C. The layer of embodiment 13C having a thickness of at least 500 nm (in some embodiments, at least 1 micrometer, 1.5 micrometer, 2 micrometer, 2.5 micrometers, 3 micrometers, 4 micrometers, 5 micrometers, 7.5 micrometers, or even at least 10 micrometers).

15C. An article comprising a substrate having first and second generally opposed major surfaces with the layer of either embodiment 13C or 14C on the first major surface.

16C. The article of embodiment 15C, wherein the substrate is a polarizer (e.g., reflective polarizer or absorptive polarizer).

17C. The article of either embodiment 15C or 16C further comprising a hardcoat comprising at least one of $SiO_2$ nanoparticles or $ZrO_2$ nanoparticles dispersed in a crosslinkable matrix comprising at least one of multi(meth)acrylate, polyester, epoxy, fluoropolymer, urethane, or siloxane.

18C. The article of any of embodiments 15C to 17C having a reflection less than 2 percent (in some embodiments, less than 1.5 percent or even less than 1 percent).

19C. The article of any of embodiments 15C to 18C having a haze less than 3 percent (in some embodiments, less than 2 percent, 1.5 percent, or even less than 1 percent).

20C. The article of any of embodiments 15C to 19C having a visible light transmission of at least 90 percent (in some embodiments, at least 94 percent, 95 percent, 96 percent, 97 percent, 98 percent, 99 percent, or even 100 percent).

21C. The article of any of embodiments 15C to 20C, further comprising a functional layer disposed between the first major surface of the substrate and the layer, wherein the functional layer is at least one of a transparent conductive layer or a gas barrier layer.

22C. The article of any of embodiments 15C to 21C, further comprising a pre-mask film disposed on the layer.

23C. The article of any of embodiments 15C to 21C, further comprising a functional layer disposed on the layer, wherein this functional layer is at least one of a transparent conductive layer or a gas barrier layer.

24C. The article of any of embodiments 15C to 20C or 23C further comprising a functional layer disposed on the second major surface of the substrate, wherein this functional layer is at least one of a transparent conductive layer or a gas barrier layer.

25C. The article of any of embodiments 15C to 20C, further comprising an optically clear adhesive disposed on the second surface of the substrate, the optically clear adhesive having at least 90% transmission in visible light and less than 5% haze.

26C. The article of embodiment 25C further comprising a major surface of a glass substrate attached to the optically clear adhesive.

27C. The article of any of embodiment 25C, further comprising a major surface of a polarizer substrate attached to the optically clear adhesive.

28C. The article of embodiment 25C further comprising a major surface of a touch sensor attached to the optically clear adhesive.

29C. The article of embodiment 25C, further comprising a release liner disposed on the second major surface of the optically clear adhesive.

30C. A method of making an article, the method comprising:
providing a layer comprising sub-micrometer particles dispersed in a polymeric precursor matrix;
at least one of drying or curing the layer; and
etching the dried or cured layer, as applicable, to provide the material article of any of embodiments 15C to 29C.

31C. The method of embodiment 30C, wherein the layer is on a substrate is at an elevated temperature relative to ambient during the etching.

32C. The method of either embodiment 30C or 31C, wherein the etching is at least one of reactive ion etching, vacuum plasma etching, atmospheric pressure plasma etching, atmospheric pressure corona etching, acid etching, or flame treatment 33C. The method of any of embodiments 30C to 32C, wherein the providing a layer includes at least one of solvent casting or extrusion casting.

34C. The method of any of embodiments 30C to 33C, wherein the curing is at least one of ultraviolet curing or thermally curing.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLE

Procedure 1—Vacuum Plasma Treatment
Plasmatherm Batch Reactor

A batch plasma system (obtained from Oerlikon, St. Petersburg, Fla., under the trade designation "PLASMATHERM" (Model 3032)) configured for reactive ion etching (RIE) with a 68.6 cm (27-inch) lower powered electrode and central gas pumping. The chamber was pumped via a roots blower (obtained as Model EH1200 from Edwards Vacuum, Tewsbury, Mass.)) backed by a dry mechanical pump (obtained as Model iQDP80 from Edwards Vacuum). RF power was delivered by a 3 kW, 13.56 Mhz solid-state generator (obtained under the trade designation "RFPP" (Model RF30H) from Advanced Energy, Fort Collins, Colo.) through an impedance matching network. The system had a nominal base pressure of 5 mTorr. The flow rates of the gases were controlled by flow controllers (obtained under the trade designation "MKS1179" form MKS Instruments, Woburn, Mass.).

Substrates for plasma treatment were placed on the lower powered electrode. Samples of the hardcoated substrates were placed on the powered electrode of the batch plasma apparatus. The plasma treatment with an oxygen plasma was conducted by flowing oxygen gas at a flow rate of 500 standard cm$^3$/min. and 3000 watts of power for the desired duration of time. After the plasma treatment was completed, the chamber was vented to the atmosphere.

Procedure 2—Measurement of Average % Reflection

Black vinyl tape (obtained from Yamato International Corporation, Woodhaven, Mich., under the trade designation "#200-38") was applied to the backside of the sample to be tested using a roller to ensure there were no air bubbles trapped between the black tape and the sample. The same black vinyl tape was similarly applied to a clear glass slide of which reflection from both sides were predetermined in order to have a control sample to establish the % reflection from the black vinyl tape in isolation. The non-taped side of first the taped sample and then the control was then placed against the aperture of a color guide sphere (obtained from BYK-Gardiner, Columbia, Md., under the trade designation "SPECTRO-GUIDE") to measure the front surface total % reflection (specular and diffuse). The % reflection was then measured at a 10° incident angle for the wavelength range of 400-700 nm, and average % reflection calculated by subtracting out the % reflection of the control.

Procedure 3—Measurement of Transmission and Haze

The measurement of average % transmission and haze was conducted with a haze meter; obtained under the trade designation "BYK HAZEGARD PLUS" from BYK Gardiner) according to ASTM D1003-11 (2011), the disclosures of which are incorporated herein by reference.

Procedure 4—Wiper and Steel Wool Treatment

The abrasion resistance of the cured films was tested using a mechanical device capable of oscillating a steel wool sheet (#0000 steel wool sheets obtained under the trade designation "MAGIC SAND-SANDING SHEETS" from Hut Products, Fulton, Mo.) adhered to a stylus which is oscillated across the film's surface. The stylus was oscillated over a 50.8 mm wide sweep width at a rate of 84.7 mm/sec. A "rub" is defined as a single traverse of 50.8 mm. The stylus had a flat, cylindrical base geometry with a diameter of 2.54 cm. The stylus was designed for attachment of weights to increase the force exerted by the steel wool normal to the film's surface. The wipers (obtained under the trade designation "WYPALL X60" from Kimberly-Clark, Neenah, Wis.) were cut to 2.54 cm discs and adhered to the 2.54 cm stylus by double side tapes for wipers rubbing test.

3.2 cm steel wool discs were die cut from the #0000 steel wool sanding sheets and adhered to the 2.54 cm stylus base with tape (obtained under the trade designation "3M BRAND SCOTCH PERMANENT ADHESIVE TRANSFER TAPE" 3M Company, St. Paul, Minn.).

Procedure 5—Durability Test

The durability test was performed by measuring the average % reflection according to Procedure 2 for the sample before and after treatment with Procedure 4.

Examples 1-6

450 grams of 1-methoxy-2-propanol, 8 grams of 75/25 3-(methacryloyloxy)propyltrimethoxy silane/PEG-silane (obtained under the trade designation "A1230" from Momentive, Wilton, Conn.) and 0.16 gram of a 5% hindered amine nitroxide inhibitor in water (obtained under the trade designation "PROSTAB 5128" from BASF, Tarrtown, N.Y.) were mixed with 400 grams of a dispersion of spherical silica nano-particles (nominal diameter of 100 nm; obtained under the trade designation "MP1040" from Nissan Chemical, Houston, Tex.) while stirring. The solution was sealed in a jar and heated to 80° C. and held at temperature for 16 hours. The water and 1-methoxy-2-propanol were removed from the mixture via rotary evaporation. After surface functionalization, the solution was dried down and then redispersed in methyl ethyl ketone (MEK) to form a 43.75 wt. % solids dispersion.

16 grams of the resulting solution was mixed with 3 grams of trimethylopropane triacrylate (obtained under the trade designation "SR351" from Sartomer, Exton, Pa.), 0.2 gram of a photoinitiator (obtained under the trade designation "IRGACURE 184" from BASF Specialty Chemicals), and 1 gram of methyl ethyl ketone (MEK) to form 50 wt. % solids dispersion in MEK. The concentration of 100 nm SiO$_2$ in the solids content was 70 wt. %. The dispersion was then coated on a melamine acrylic primed, 127 micrometer (5 mil) polyethylene terephthalate (PET) film (obtained under the designation "618" obtained from Dupont, Wilmington, Del.) with a #10 Meyer rod. The coating was dried in air at room temperature, and then subsequently further cured by UV irradiation using an H Bulb (300 watts per linear inch; obtained from Fusion Systems, Rockville, Md.) at 15.24 mpm (meters per minute) (50 fpm (feet per minute)).

The resulting 100 nm SiO$_2$ coated film was treated by Procedure 1 under a pressure of 100 mTorrs. The 100 nm SiO$_2$ coated film and the samples after different etching times by Procedure 1 were treated by wipes rubbing per Procedure 4, and then tested by Procedures 2 and 3. Results are provided in Table 1, below.

TABLE 1

| | | Average % R | | Haze | | Visual |
|---|---|---|---|---|---|---|
| Example | Etching time, Seconds | Before rubbing | After Using Wipes, 325 gm, 50 rubs | Before rubbing | After Using Wipes, 325 gm 50 rubs | inspection after WypALL rubbing |
| 1 | 0 | 3.94 | 3.94 | 0.86 | 0.95 | No scratch |
| 2 | 4 | 2.65 | 2.62 | 0.85 | 1.04 | No scratch |

TABLE 1-continued

| Example | Etching time, Seconds | Average % R Before rubbing | After Using Wipes, 325 gm, 50 rubs | Haze Before rubbing | After Using Wipes, 325 gm 50 rubs | Visual inspection after WypALL rubbing |
|---|---|---|---|---|---|---|
| 3 | 6 | 2.43 | 2.42 | 0.88 | 1.09 | No scratch |
| 4 | 8 | 1.93 | 2.59 | 0.9 | 1.35 | Light scratch |
| 5 | 15 | 1.11 | 2.78 | 0.88 | 1.88 | Scratch |
| 6 | 20 | 1.1 | 3.23 | 0.89 | 1.44 | Scratch |

Examples 7-15

450 grams of 1-methoxy-2-propanol, 6 grams of 3-(methacryloyloxy)propyltrimethoxy silane and 0.16 gram of a 5% hindered amine nitroxide inhibitor in water ("PROSTAB 5128") were mixed with 400 grams of a 190 nm silica dispersion("MP2040") while stirring. The solution was sealed in a jar and heated to 80° C. and held at temperature for 16 hours. The water and 1-methoxy-2-propanol were removed from the mixture via rotary evaporation. The resulting dried, surface functionalized silica particles were redispersed in 88/12 1-methyoxy-2-propanol/water mixture followed by sonication and filtration to form a 54.9 wt. % solids dispersion.

A monomer blend of pentaerythritol triacrylate, 1,6 hexanediol diacrylate, and isobornyl acrylate, (obtained under the trade designations "SR444", "SR238", "SR506", respectively from Sartomer) in a 40/40/20 ratio was blended with the 3-(methacryloyloxy)propyltrimethoxy silane modified 190 nm silica particles dispersion to form 75 wt % of 3-(methacryloyloxy)propyltrimethoxy silane modified 190 nm silica particles (in the solid portion of monomer blend and silica particles) dispersion. This dispersion was further diluted with MEK to form a 30 wt. % dispersion. 3 wt. % of photoinitiator ("IRGACURE 184") (ratio to the solids in the dispersion) was then added and mixed in.

The resulting dispersion was then coated on a biaxially oriented 50.8 micrometer (2 mil) polyethylene terephthalate (PET) film by a roll to roll coating process using a 127 micrometer (5 mil) gap (web speed: 1.524 mpm (5 fpm)). The coating was dried in air at room temperature, and then subsequently further dried at 82.2° C. (180° F.), and the binder cured by UV irradiation with an H bulb (Fusion).

To estimate the etching rate of vacuum $O_2$ plasma, the same coating without particles was applied onto a silicone wafer (under the designation "SOI P(100)" obtained from University Wafer, South Boston, Mass.) and cured with an H bulb (Fusion) at 15.24 mpm (50 fpm) and UV chamber was purged with $N_2$. The coating thickness before and after etching was measured. The etching rate was determined to be about 11 nm/sec.

The coated 50.8 micrometer (2 mil) PET films were etched according Procedure 1, and treated and tested by Procedures 2-4. Results are provided in Table 2, below.

TABLE 2

| Example | Etching time, Sec.) | Estimated etching depth, nm | Average % R Before rubbing | After steel wool 325 gm, 50 rubs | Haze Before rubbing | After steel wool 325 gm, 50 rubs | Visual inspection after steel wool rubbing |
|---|---|---|---|---|---|---|---|
| 7 | 0 | 0 | 3.92 | 3.93 | 1.8 | 1.96 | No scratch |
| 8 | 5 | 55 | 1.76 | 1.84 | 1.85 | 1.91 | No scratch |
| 9 | 8 | 88 | 1.59 | 1.62 | 1.83 | 1.76 | No scratch |
| 10 | 10 | 110 | 1.13 | 1.1 | 1.82 | 1.86 | No scratch |
| 11 | 11 | 121 | 1.06 | 1.32 | 1.93 | 2.33 | No scratch |
| 12 | 13 | 143 | 1.07 | Not measured (N/M) | 2.04 | N/M | Light scratch |
| 13 | 14 | 156 | 1.05 | N/M | 2.08 | N/M | Scratch |
| 14 | 15 | 167 | 1.05 | N/M | 2.12 | N/M | Scratch |
| 15 | 17 | 189 | 1.27 | N/M | 2.12 | N/M | Scratch |

Examples 16 and 17

450 grams of 1-methoxy-2-propanol, 6 grams of 3-(methacryloyloxy)propyltrimethoxy silane and 0.16 gram of a 5% hindered amine nitroxide inhibitor in water ("PROSTAB 5128") were mixed with a 190 nm silica dispersion ("MP2040") while stirring. The solution was sealed in a jar and heated to 80° C. and held at temperature for 16 hours. The water and 1-methoxy-2-propanol were removed from the mixture via rotary evaporation. The resulting dried, surface functionalized silica particles were redispersed in 88/12 1-methyoxy-2-propanol/water mixture followed by sonication and filtration to form a 42.4 wt. % solids dispersion.

A monomer blend of pentaerythritol triacrylate, 1,6 hexanediol diacrylate, and isobornyl acrylate, ("SR444", "SR238", "SR506", respectively) in a 40/40/20 ratio was blended with the 3-(methacryloyloxy)propyltrimethoxy silane modified 190 nm silica particles dispersion to form 65 wt. % of 3-(methacryloyloxy)propyltrimethoxy silane modified 190 nm silica particles (in the solid portion of monomer blend and silica particles) dispersion. This dispersion was further diluted by 1-methoxy-2-propanol to form a 30 wt. % dispersion. 2 wt. % of photoinitiator ("IRGACURE 184") (ratio to the solids in the solution) was then added to the dispersion and mixed in.

The resulting dispersion was then coated on a 50.8 micrometer (2 mil) PET film (obtained under the designation "U48" from Toray Advanced Films Co., Ltd., Tokyo, Japan) via a #6 Meyer rod. The coating was dried in air at room temperature, and then subsequently further cured by UV irradiation with an H Bulb (Fusion) at 15.24 mpm (50 fpm). The coated film was then treated by Procedure 1 under a pressure of 100 mTorrs. The coated film and the samples after different etching times via Procedure 1 were further treated by steel wool rubbing via Procedure 4, and then tested by Procedures 2 and 3. Results are provided in Table 3, below.

TABLE 3

| Example | Etching time, Seconds | Average % R Before rubbing | After Steel wool 200 gm, 20 rubs | Haze Before rubbing | After steel wool 200 gm, 20 rubs | Visual inspection after steel wool rubbing |
|---|---|---|---|---|---|---|
| 16 | 10 | 0.71 | 0.82 | 0.67 | 0.76 | No scratch |
| 17 | 12 | 0.48 | 0.67 | 0.81 | 1.3 | Light scratch |

Example 18

450 grams of 1-methoxy-2-propanol, 6 grams of 3-(methacryloyloxy)propyltrimethoxy silane and 0.16 gram of a 5% hindered amine nitroxide inhibitor in water ("PROSTAB 5128") were mixed with a 190 nm silica dispersion ("MP2040") while stirring. The solution was sealed in a jar and heated to 80° C. and held at temperature for 16 hours. The water and 1-methoxy-2-propanol were removed from the mixture via rotary evaporation. The resulting dried, surface functionalized silica particles were redispersed in 88/12 1-methyoxy-2-propanol/water mixture followed by sonication and filtration to form a 42.4 wt. % solids dispersion.

A monomer blend of pentaerythritol triacrylate, 1,6 hexanediol diacrylate, and isobornyl acrylate, ("SR444", "SR238", "SR506", respectively) in a 40/40/20 ratio was blended with the 3-(methacryloyloxy)propyltrimethoxy silane modified 190 nm silica particles dispersion to form 65 wt. % of 3-(methacryloyloxy)propyltrimethoxy silane modified 190 nm silica particles (in the solid portion of monomer blend and silica particles) dispersion. This dispersion was further diluted by 1-methoxy-2-propanol to form a 30 wt. % dispersion. 2 wt. % of photoinitiator ("IRGACURE 184") (ratio to the solids in the solution) was then added to the dispersion and mixed in.

Figure 6:
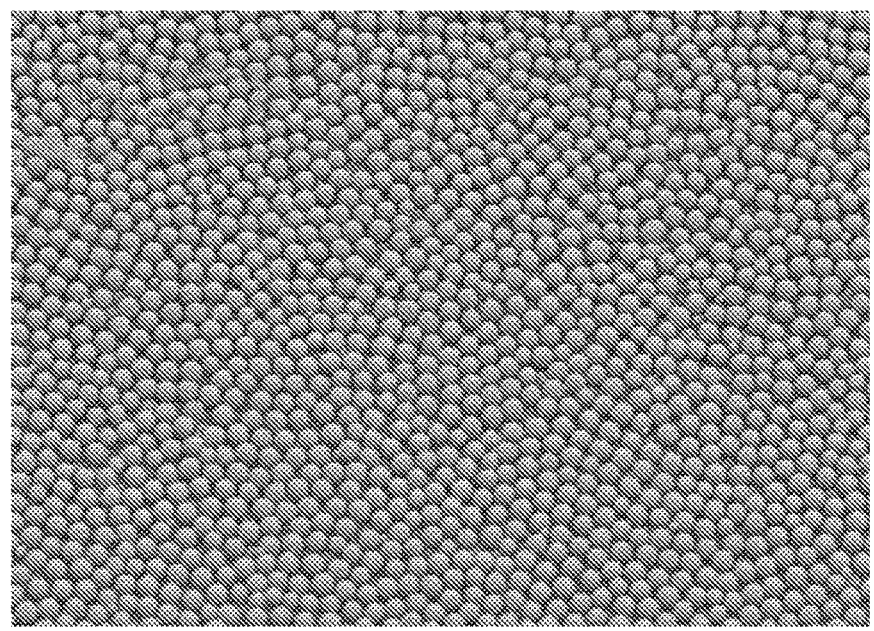
FIG. 6 is a scanning electron photomicrograph at 15,000× of the top view of a major surface of Example 18.
Figure 7:
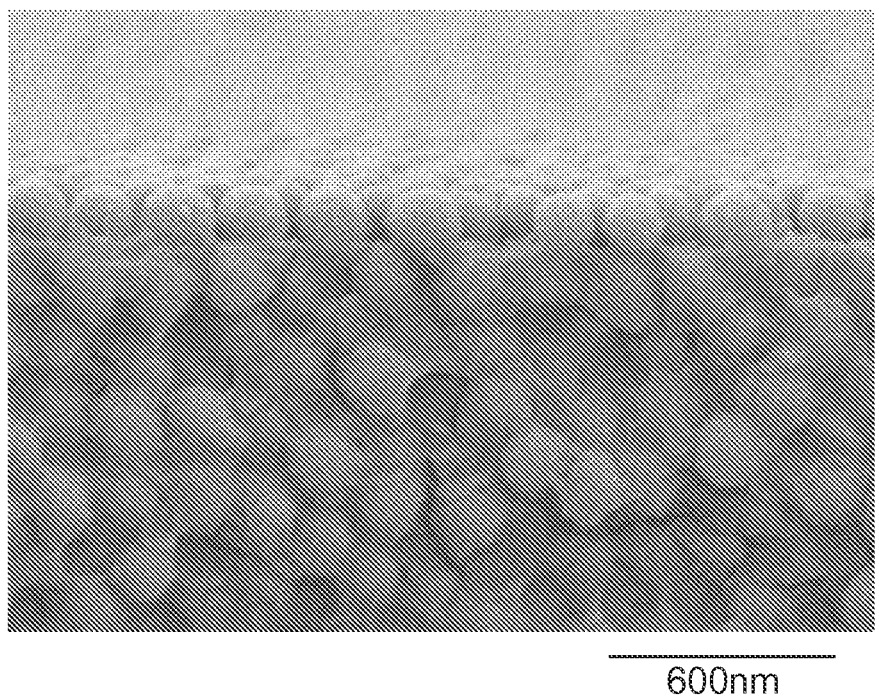
FIG. 7 is a scanning electron photomicrograph at 15,000× of a cross-sectional view of Example 18.

The resulting dispersion was then coated on a 50.8 micrometer (2 mil) PET film (obtained under the designation "U48" from Toray Advanced Films Co., Ltd., Tokyo, Japan) via a #6 Meyer rod. The coating was dried in air at room temperature, and then subsequently further cured by UV irradiation with an H Bulb (Fusion) at 15.24 mpm (50 fpm). The coated film was then treated by Procedure 1 for 15 seconds under a pressure of 100 mTorrs. The top surface and a cross-section of Example 18 is shown in FIGS. 6 and 7, respectively.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A material comprising sub-micrometer particles and polymeric matrix, wherein the sub-micrometer particles consist of a first portion of the sub-micrometer particles dispersed within the polymeric matrix and a second portion dispersed in the polymeric matrix, wherein the material has a major surface, wherein the sub-micrometer particles have particle sizes of at least 75 nm, wherein the second portion of the sub-micrometer particles protrude from the major surface by up to 90 percent of their respective particle sizes, wherein the protruding sub-micrometer particles each have an exposed outer surface, and wherein less than 50 percent of the exposed outer surface is covered by organic material.

2. The material of claim 1, wherein the sub-micrometer particles are covalently bonded to the polymeric matrix.

3. The material of claim 1, wherein at least a portion of the polymeric matrix comprises at least one of tetrafluoroethylene, vinylfluoride, vinylidene fluoride, chlorotrifluoroethylene, perfluoroakoxy, fluorinated ethylene-propylene, ethylenetetrafluoroethylene, ethylenechlorotrifluoroethylene, perfluoropolyether, perfluoropolyoxetane, hexafluoropropylene oxide, siloxane, organosilicon, siloxides, silyl halides, ethylene oxide, propylene oxide, hydroxyl, hydroxylamine, carboxylic acid, —COONa, —SO$_3$Na, —HCONCH$_3$, —CONEt$_2$, acrylamide, amine, ether, sulfonate, acrylic acid, maleic anhydride, vinyl acid, vinyl alcohol, vinylpyridine, vinypyrrolidone, acetylene, pyrrole, thiophene, aniline, phenylene sulfide, or imidazole.

4. The material of claim 1, wherein at least some of the sub-micrometer particles are functionalized with at least one multifunctional silane coupling agent comprising silanol and at least one of acrylate, epoxy, or vinyl functional groups.

5. The material of claim 1, wherein the sub-micrometer particles are present in a range from 10 percent to 70 percent by volume, based on the total volume of the material.

6. The material of claim 1, wherein the sub-micrometer particles comprise at least one of carbon, metal, metal oxide, metal carbide, metal nitride, or diamond.

7. The material of claim 1, wherein the sub-micrometer particles have particle sizes in a range from 75 nm to 500 nm.

8. The material of claim 1, wherein the sub-micrometer particles have a bimodal distribution.

9. The material of claim 1, wherein the portion of the sub-micrometer particles protruding from the major surface protrudes by up to 50 percent of their respective particle sizes.

10. The material of claim 1, wherein the portion of the sub-micrometer particles protruding from the major surface protrudes in a range from 60 nm to 300 nm.

11. The material of claim 1, wherein there is an average spacing between the protruding sub-micrometer particles is in a range from 5 nm to 300 nm.

12. The material of claim 1, wherein the polymeric matrix comprises at least one of acrylate, urethane acrylate, methacrylate, polyester, epoxy, fluoropolymer, or siloxane.

13. The material of claim 1 having a change in reflection from the Durability Test of less than 2 percent.

14. The material of claim 1 that is a layer.

15. The layer of claim 14 having a thickness of at least 500 nm.

16. An article comprising a substrate having first and second generally opposed major surfaces with a layer of the material of claim 1 on the first major surface.

17. A method of making an article, the method comprising:
- providing a layer comprising sub-micrometer particles dispersed in a polymeric precursor matrix;
- at least one of drying or curing the layer; and
- etching the dried or cured layer, as applicable, to provide the article of claim 16.

\* \* \* \* \*

UNITED STATES PATENT AND TRADEMARK OFFICE
CERTIFICATE OF CORRECTION

PATENT NO.         : 10,036,831 B2
APPLICATION NO.    : 14/237401
DATED              : July 31, 2018
INVENTOR(S)        : Yu et al.

It is certified that error appears in the above-identified patent and that said Letters Patent is hereby corrected as shown below:

Column 8
Line 65, delete "tri-methoxy-silane," and insert -- trimethoxy-silane, --, therefor.

Column 30
Line 34, delete "ethylenetetrafluoro ethylene," and insert -- ethylenetetrafluoroethylene, --, therefor.

Signed and Sealed this
Sixth Day of November, 2018

Andrei Iancu
*Director of the United States Patent and Trademark Office*